(12) United States Patent
Hatakeyama et al.

(10) Patent No.: US 10,501,585 B2
(45) Date of Patent: Dec. 10, 2019

(54) STRETCHABLE FILM AND METHOD FOR FORMING THE STRETCHABLE FILM

(71) Applicant: SHIN-ETSU CHEMICAL CO., LTD., Tokyo (JP)

(72) Inventors: Jun Hatakeyama, Jyoetsu (JP); Motoaki Iwabuchi, Jyoetsu (JP); Osamu Watanabe, Jyoetsu (JP); Tohru Kubota, Jyoetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 76 days.

(21) Appl. No.: 15/855,452

(22) Filed: Dec. 27, 2017

(65) Prior Publication Data

US 2018/0215876 A1    Aug. 2, 2018

(30) Foreign Application Priority Data

Jan. 30, 2017   (JP) ................ 2017-014685

(51) Int. Cl.
| | |
|---|---|
| *C08G 77/458* | (2006.01) |
| *C08F 293/00* | (2006.01) |
| *C08G 18/32* | (2006.01) |
| *C08G 18/38* | (2006.01) |
| *C08G 18/48* | (2006.01) |
| *C08G 18/66* | (2006.01) |
| *C08G 18/75* | (2006.01) |
| *C08G 18/76* | (2006.01) |
| *C08G 18/78* | (2006.01) |
| *C08J 5/18* | (2006.01) |
| *B29D 7/01* | (2006.01) |
| *C08G 18/72* | (2006.01) |
| *C08G 18/79* | (2006.01) |
| *C08G 18/81* | (2006.01) |
| *C08F 283/00* | (2006.01) |
| *C08L 83/10* | (2006.01) |

(52) U.S. Cl.
CPC ............ *C08G 77/458* (2013.01); *B29D 7/01* (2013.01); *C08F 283/00* (2013.01); *C08F 293/00* (2013.01); *C08G 18/3206* (2013.01); *C08G 18/3212* (2013.01); *C08G 18/3228* (2013.01); *C08G 18/3893* (2013.01); *C08G 18/4825* (2013.01); *C08G 18/4833* (2013.01); *C08G 18/4854* (2013.01); *C08G 18/6674* (2013.01); *C08G 18/6681* (2013.01); *C08G 18/6685* (2013.01); *C08G 18/725* (2013.01); *C08G 18/755* (2013.01); *C08G 18/758* (2013.01); *C08G 18/7614* (2013.01); *C08G 18/7621* (2013.01); *C08G 18/7893* (2013.01); *C08G 18/791* (2013.01); *C08G 18/8116* (2013.01); *C08J 5/18* (2013.01); *C08J 2353/00* (2013.01); *C08J 2375/16* (2013.01); *C08J 2383/10* (2013.01); *C08L 83/10* (2013.01)

(58) Field of Classification Search
CPC ............. C08G 18/289; C08G 18/3206; C08G 18/3212; C08G 77/458; C08L 83/10
USPC ........................................... 526/279; 528/28
See application file for complete search history.

(56) References Cited

U.S. PATENT DOCUMENTS

| | | | | |
|---|---|---|---|---|
| 4,839,443 | A | 6/1989 | Akutsu et al. | |
| 5,352,714 | A * | 10/1994 | Lai ..................... | A61L 27/18 523/107 |
| 5,426,158 | A * | 6/1995 | Mueller ............... | C08G 18/61 525/455 |
| 6,602,930 | B2 * | 8/2003 | Imafuku .............. | C08F 283/12 351/159.03 |
| 2005/0245719 | A1 * | 11/2005 | Mather ................ | C08G 18/3893 528/60 |
| 2010/0297376 | A1 * | 11/2010 | Shi ...................... | B32B 7/12 428/41.8 |
| 2015/0004406 | A1 | 1/2015 | Suzuki et al. | |
| 2019/0117101 | A1 * | 4/2019 | Hatakeyama ........ | A61B 5/0408 |

FOREIGN PATENT DOCUMENTS

| | | |
|---|---|---|
| JP | H01-288370 A | 11/1989 |
| JP | 2583412 B2 | 2/1997 |
| JP | 2624060 B2 | 6/1997 |
| JP | H09-316085 A | 12/1997 |
| JP | 2004-033468 A | 2/2004 |
| JP | 2011-194757 A | 10/2011 |
| JP | 2013-139534 A | 7/2013 |
| WO | 2009/130767 A1 | 10/2009 |

OTHER PUBLICATIONS

Jun. 29, 2018 Extended Search Report issued in European Patent Application No. 18154293.7.
XP-002781372, Database WPI Week 199001 Thomson Scientific, An 1990-004638, Nov. 1989.
XP-002781373, Database WPI Week 200974 Thomson Scientific, An 2009-045153, Oct. 2009.
Jan. 15, 2019 Office Action issued in Korean Patent Application No. 10-2018-00009257.

\* cited by examiner

*Primary Examiner* — Margaret G Moore
(74) *Attorney, Agent, or Firm* — Oliff PLC

(57) ABSTRACT

The present invention provides a stretchable film that is excellent in stretch and strength and water repellency on the film surface, and a method for forming the stretchable film. The present invention was accomplished by a stretchable film including a resin having a branched siloxane bond having 3 to 11 silicon atoms on a side chain and having a urethane bond on a main chain.

12 Claims, 6 Drawing Sheets

STRETCHABLE FILM AND METHOD FOR FORMING THE STRETCHABLE FILM

TECHNICAL FIELD

The present invention relates to a stretchable film excellent in stretch, strength, and water repellency, and a method for forming the stretchable film.

BACKGROUND

A recent growing popularity of Internet of Things (IoT) has accelerated the development of such major wearable devices as watches and glasses that allow for Internet access. Even in the fields of medicine and sports, wearable devices for constantly monitoring the user's physical state are increasingly demanded, and such technological development is expected to be further encouraged.

One typical wearable device is attached to the human body of users to constantly monitor the state of physical conditions. The wearable device normally includes a bioelectrode for detecting an electric signal transmitted from a body, wires for sending the electric signal to a sensor, a semiconductor chip serving as a sensor, and a battery, as well as an adhesive pad to be attached to the skin. Patent Document 1 describes detailed structures of a bioelectrode, a wiring part surrounding the bioelectrode, and an adhesive pad. The wearable device disclosed in Patent Document 1 includes a bioelectrode, a silicone-based adhesive film disposed around the bioelectrode, a sensor device, and a meandering-shaped stretchable silver wiring part coated with a stretchable urethane film between the bioelectrode and the sensor device.

The urethane film has high stretch and strength, and excellent mechanical properties as a film coated on a stretchable wiring part. Unfortunately, the hydrolysis inherent in the urethane film lowers its stretch and strength, while the silicone film has no such hydrolysis, but the strength inherently remains low.

The use of silicone urethane polymers, whose main chain has both a urethane bond and a siloxane bond, has been examined. Advantageously, cured products of the silicone urethane polymer are characterized by higher strength than a single silicone component and lower hydrolysis than a single polyurethane component. Such cured products unfortunately fail to achieve the strength equivalent to a single polyurethane component and the water repellency equivalent to a single silicone component, and the strength and water repellency are in-betweens of those inherent in silicone and polyurethane components.

On the other hand, another type of material, including blended polyurethane and silicone components, has been examined in e.g., Patent Documents 2 and 3, each describing a material obtained by blending an unreactive silicone component and a crosslinking polyurethane component. Formation of a film from such a material allows silicone to come up to the cured film surface of polyurethane (bleedout) to improve the water repellency on the film surface. However, the non-crosslinking silicone causes itself to come off the film surface, thereby readily reducing the water repellency. Also, since a surfaceless state doesn't enable silicone to come up to the film surface, the film obtained by sandwiching its both sides between sheets for compression molding has low water repellency.

In addition, the use of diol materials for synthesizing polyurethane having siloxane on a side chain has been proposed. Patent Documents 4 and 5 each describe a diol compound for forming polyurethane having a silicone component on a side chain. The side-chain silicone group shown herein is a linear silicone in which siloxane is bonded to a diol compound at a terminal group.

PRIOR ART DOCUMENTS

Patent Documents

Patent Document 1: Japanese Unexamined Patent publication (Kokai) No. 2004-033468
Patent Document 2: Japanese Unexamined Patent publication (Kokai) No. 2011-194757
Patent Document 3: Japanese Unexamined Patent publication (Kokai) No. 2013-139534
Patent Document 4: Japanese Patent No. 2583412
Patent Document 5: Japanese Patent No. 2624060

SUMMARY OF THE INVENTION

Problem to be Solved by the Invention

Due to these conventional problems, the development of a stretchable film having excellent stretch and strength that are equivalent to a single polyurethane component and having excellent water repellency that is equivalent to a single silicone component, and a method for forming the stretchable film is strongly desired.

The present invention was made in view of the situation to solve the problems, and has an object to provide a stretchable film that is excellent in stretch, strength, and water repellency on the film surface, and a method for forming the stretchable film.

Means for Solving the Problem

To solve these problems, the present invention provides a stretchable film including a resin having a branched siloxane bond having 3 to 11 silicon atoms on a side chain and a urethane bond on a main chain.

The stretchable film thus obtained is excellent in stretch, strength, and water repellency on the film surface.

Preferably, the resin includes a structure represented by the following general formula (1),

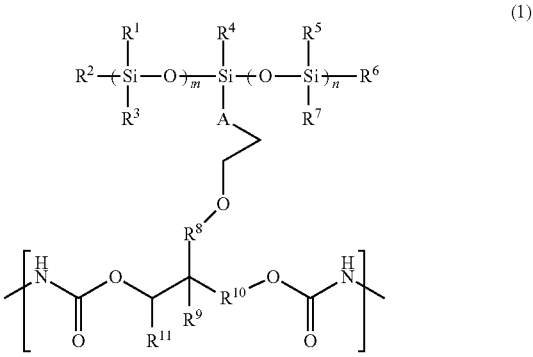

wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; A represents a linear or a branched alkylene group having 1 to 4 carbon atoms; and each of "m" and "n" independently represents an integer of 1 to 5.

The stretchable film thus obtained is more excellent in stretch, strength, and water repellency on the film surface.

Preferably, the resin is a reactant of a diol compound represented by the following general formula (2) and a compound including an isocyanate group,

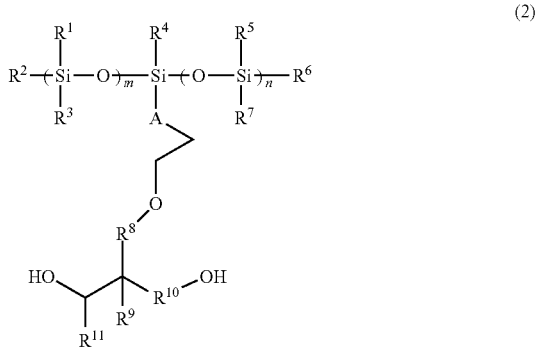

(2)

wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; A represents a linear or a branched alkylene group having 1 to 4 carbon atoms; and each of "m" and "n" independently represents an integer of 1 to 5.

Preferably, the resin included in the stretchable film of the present invention is a reactant of the diol compound and a compound including an isocyanate group.

In addition, it is preferable that the resin be a cured product of a compound including a (meth) acrylate group as a terminal group represented by the following general formula (3),

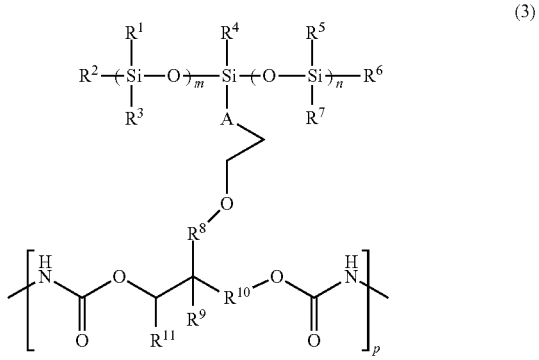

(3)

-continued

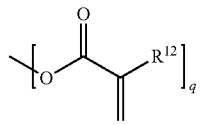

wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; A represents a linear or a branched alkylene group having 1 to 4 carbon atoms; each of "m" and "n" independently represents an integer of 1 to 5; $R^{12}$ represents a hydrogen atom or a methyl group; and each of "p" and "q" independently represents the number of unit in one molecule satisfying equations $1 \leq p \leq 100$ and $1 \leq q \leq 3$.

The resin included in the stretchable film of the present invention is preferably the cured product of a compound including a (meth) acrylate group as a terminal group.

Preferably, the resin has a weight average molecular weight of 500 or more.

The resin thus obtained can desirably be used in the stretchable film of the present invention.

The stretchable film preferably has a stretching property of 40 to 500% in a tensile test stipulated according to JISK6251 standards.

With the stretching property, the stretchable film can desirably be used as a film coated on a stretchable wire.

The stretchable film is preferably used as a film in contact with a stretchable conductive wire.

The stretchable film of the present invention can preferably be used for these applications.

The present invention provides a method for forming the stretchable film, including: mixing a diol compound represented by the following general formula (2) and a compound including an isocyanate group; shaping the resulting mixture into a film; and curing the film by heating,

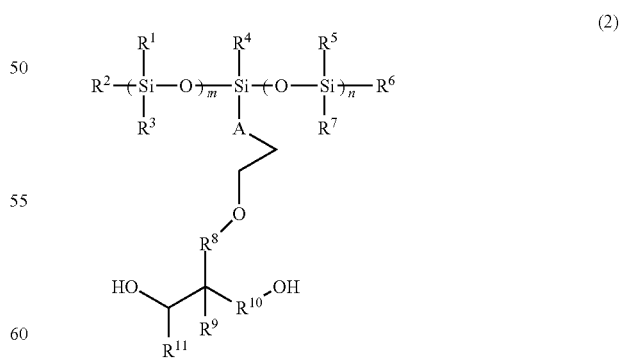

(2)

wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; A represents a linear or a branched alkylene group having 1 to 4 carbon atoms; and each of "m" and "n" independently represents an integer of 1 to 5.

The method for forming a stretchable film thus obtained can readily form a stretchable film excellent in stretch and strength that are equivalent to or more desirable than a single polyurethane component and having high water repellency on the film surface.

Also, the present invention provides a method for forming the stretchable film, including: shaping a compound including a (meth) acrylate group as a terminal group represented by the following general formula (3) into a film; and curing the film by heating and/or light exposure,

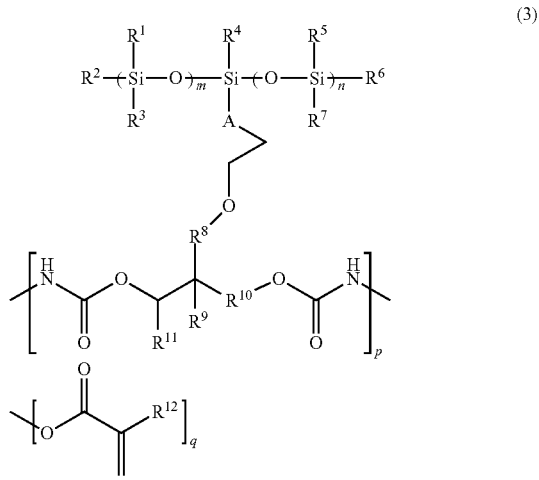

(3)

wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; A represents a linear or a branched alkylene group having 1 to 4 carbon atoms; each of "m" and "n" independently represents an integer of 1 to 5; $R^{12}$ represents a hydrogen atom or a methyl group; and each of "p" and "q" independently represents the number of unit in one molecule satisfying equations $1 \leq p \leq 100$ and $1 \leq q \leq 3$.

The heating and light exposure curing processes can be combined in the method for forming a stretchable film of the present invention.

Effect of the Invention

As described above, the stretchable film of the present invention has excellent stretch and strength that are equivalent to a single polyurethane component and the film surface has high water repellency that is equivalent to or more desirable than a single silicone component whose main chain is a siloxane bond. The water repellency may be improved by blending polyurethane and silicone and unevenly distributing silicone over the film surface by baking. In this method, since a surfaceless state doesn't enable silicon to come up to the surface, the film whose both sides are sandwiched between sheets in a closed state has low water repellency. In order to promote uneven distribution of silicone on the surface, a solvent whose boiling point is in the range of 100 to 200° C. must be blended, and it is impossible to form a film without any solvent, thereby limiting applications of compositions and processes of forming a film. On the other hand, the stretchable film of the present invention is based on a urethane resin having a branched silicone on a side chain. Accordingly, while the branched silicone on a side chain can efficiently improve the water repellency of a stretchable film in small quantities, urethane on a main chain can improve the stretch and strength of the stretchable film. Since the silicone on a side chain is always oriented toward the surface, the water repellency is kept high even though both sides of the film are sandwiched between sheets to form a stretchable film in a closed state. The stretchable wiring film obtained by bringing the stretchable film into contact with a conductive wire or coating either or both surfaces of the conductive wire are excellent not only in stretch and strength, but also in water repellency on the surface. Accordingly, the stretchable film of the present invention can particularly desirably be used as a stretchable film capable of mounting not only a wiring part for connecting a bio-electrode and a sensor but also all of such a bio-electrode and sensor in a wearable device.

DESCRIPTION OF THE PREFERRED EMBODIMENTS

Figure 1:
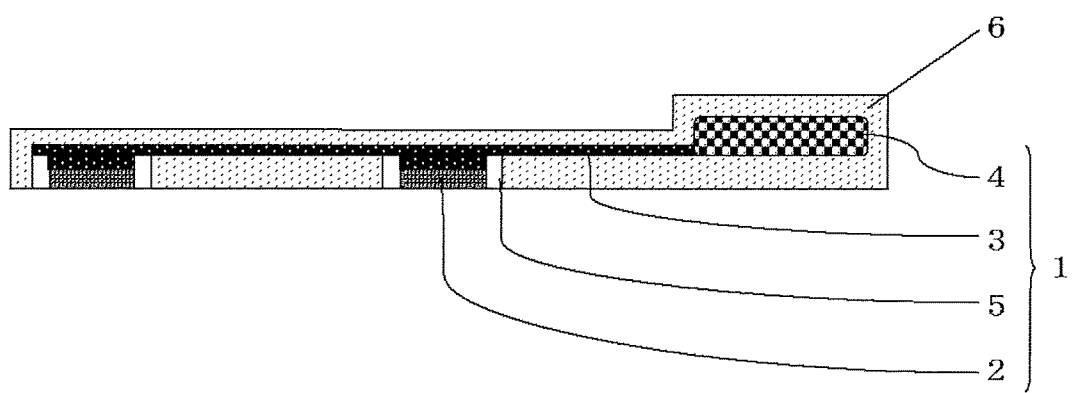
FIG. 1 is a cross-sectional view showing an electrocardiograph that is covered with a stretchable film of the present invention.

As described above, polyurethane has sufficient stretch and strength, but unfortunately the water repellency is low and the hydrolysis can lower the strength and stretch. Also, another drawback is that silicone has high water repellency, but low strength. In a cured product having a silicone urethane polymer whose main chain has both urethane bond and siloxane bond, the strength and water repellency are in-betweens of those inherent in polyurethane and silicone, and the strength and water repellency fail to achieve those equivalent to single polyurethane and silicone components, respectively. In addition, the water repellency may be improved by blending polyurethane and silicone and unevenly distributing silicone over the film surface by baking. In this method, since a surfaceless state doesn't allow silicon to come up to the surface, the film whose both sides are sandwiched between sheets in a closed state has low water repellency. In this method, in order to promote uneven distribution of silicone on the surface, a solvent whose boiling point is in the range of 100 to 200° C. must be blended, and it is impossible to form a film without any solvent, thereby limiting applications of compositions and processes of forming a film. Under the circumstances, development of a stretchable film having excellent stretch and strength that are equivalent to a single polyurethane component, sufficient high strength on the film surface, and having excellent water repellency and surface hardness that are equivalent to or more desirable than a single silicone component, and a method for forming the stretchable film is strongly desired.

Inventors of the present invention have carried out an extended investigation and found that a film having high water repellency and a film excellent in stretch and strength, based on a resin having a short chain branched siloxane having high water repellency on a side chain and a urethane bond on a main chain as a base, has excellent stretch and strength that are equivalent to a single polyurethane component, and the film surface serves as a stretchable film of water repellency that is equivalent to or more desirable than a single silicone component. The film thus obtained is particularly desirable as a film coated on a stretchable wire in a wearable device. Based on that information, the present invention was accomplished.

Inventors of the present invention found that a film including a resin having a short chain branched siloxane on a side chain and a urethane bond on a main chain has stretch and strength that are equivalent to a single polyurethane component and high water repellency, and is useful as a film for coating a stretchable bio-electrode.

Specifically, the present invention provides a stretchable film including a resin having a branched siloxane bond having 3 to 11 silicon atoms on a side chain and having a urethane bond on a main chain.

The present invention will be described in detail, but the present invention is not restricted thereto.

Stretchable Film

The stretchable film of the present invention is a cured product of a resin, and the resin has a branched siloxane bond (short chain branched siloxane) having 3 to 11 silicon atoms on a side chain and having a urethane bond on a main chain.

Resin

The resin in the stretchable film of the present invention has a branched siloxane bond having 3 to 11 silicon atoms on a side chain and a urethane bond on a main chain. Such a resin preferably includes a structure represented by the following general formula (1),

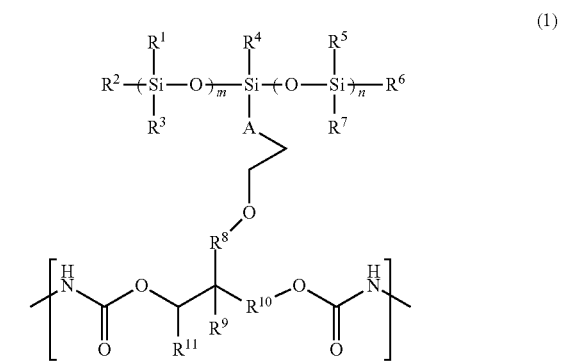

wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; A represents a linear or a branched alkylene group having 1 to 4 carbon atoms; and each of "m" and "n" independently represents an integer of 1 to 5.

The resin including a structure represented by the general formula (1) is preferably a reactant of a diol compound represented by the following general formula (2) and a compound including an isocyanate group (hereinafter also referred to as isocyanate compound),

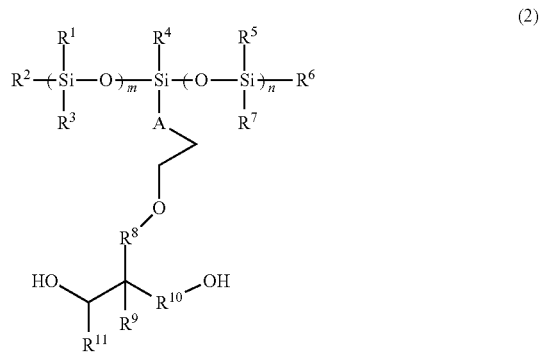

wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; A represents a linear or a branched alkylene group having 1 to 4 carbon atoms; and each of "m" and "n" independently represents an integer of 1 to 5.

A diol compound having a short chain pendant siloxane represented by the general formula (2) can be obtained, e.g., by reaction of glycerinmonoallyl ether, and a short chain siloxane compound having a SiH group on a siloxane chain in the presence of a platinum catalyst. Illustrative example of the diol compound includes the following compounds.
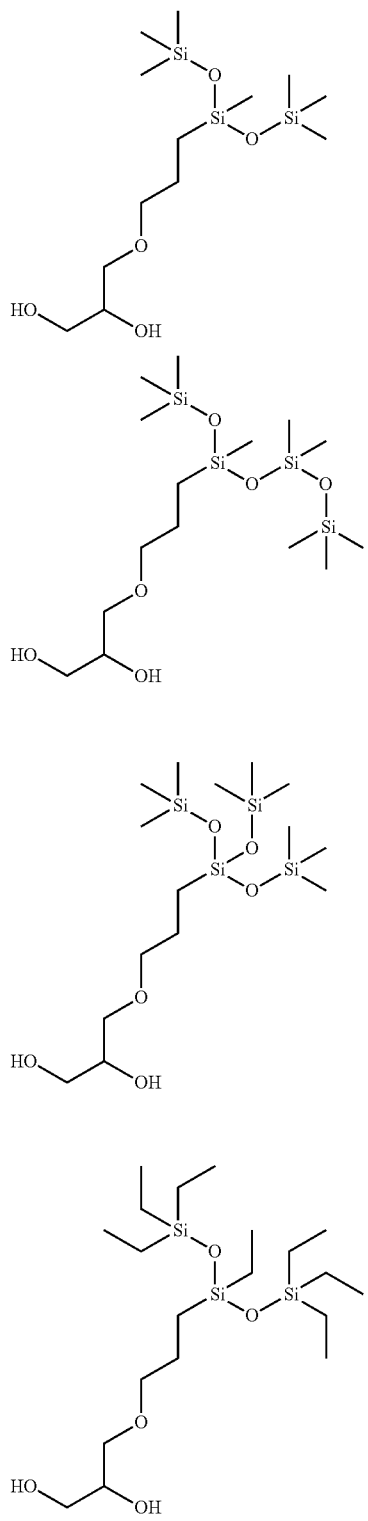
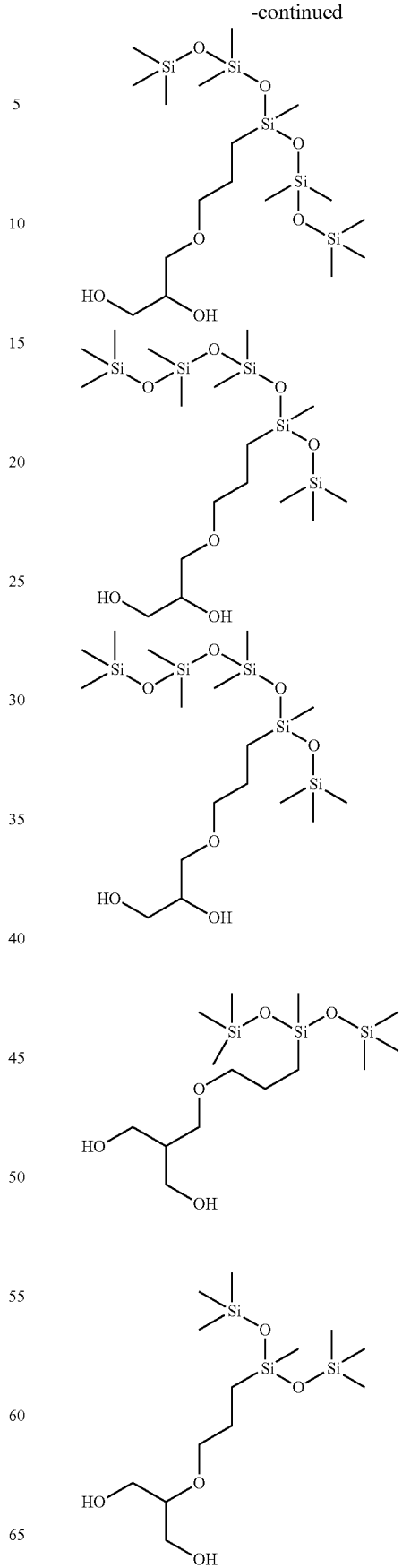

-continued
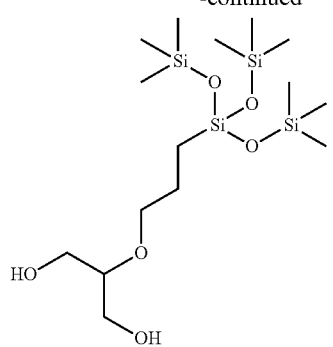
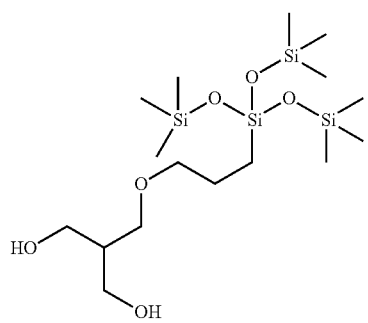
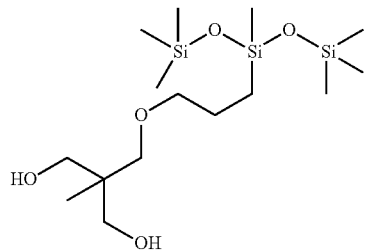
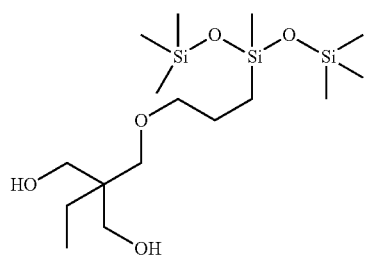
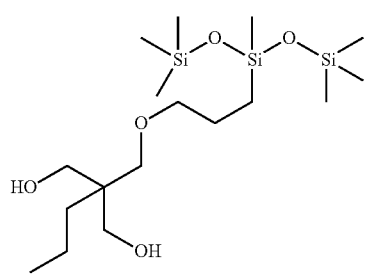
-continued
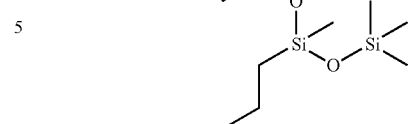
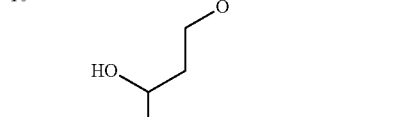
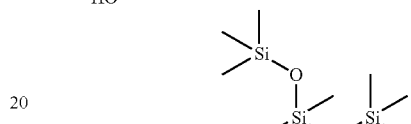
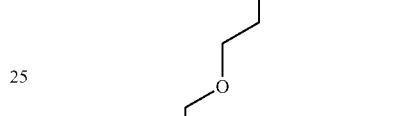
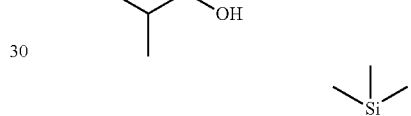
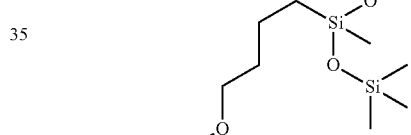
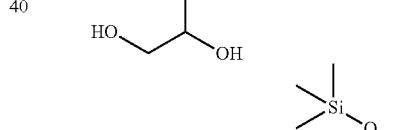
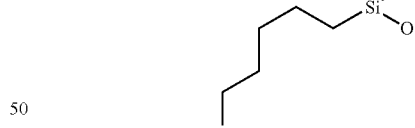
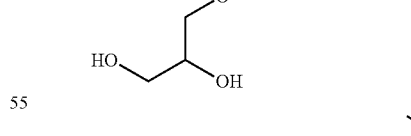
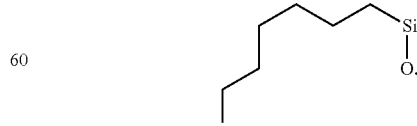
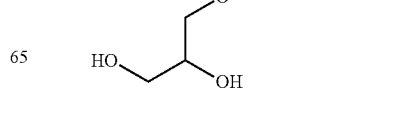

-continued
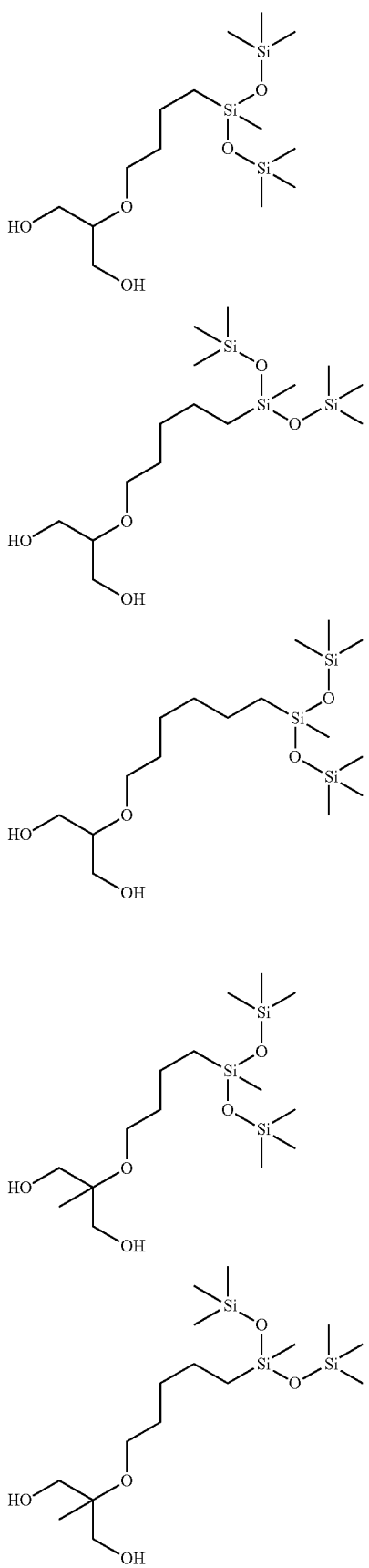
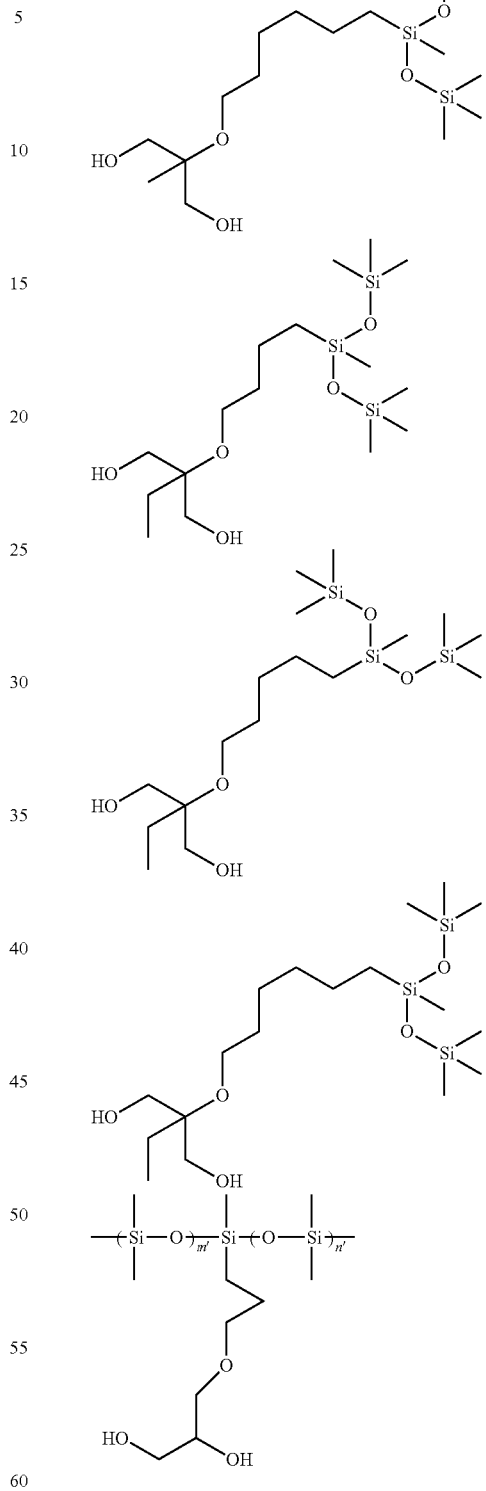
wherein, m'+n'=10.
Herein, the diol compound includes a siloxane bond having 3 to 11 silicon atoms. When the number of silicon atoms exceeds 11, the strength of the stretchable film declines. Improved water repellency requires use of short chain siloxane having 3 to 11 silicon atoms only.

Furthermore, a resin including a structure represented by the general formula (1) is preferably a cured product obtained by curing a compound including a (meth) acrylate group as a terminal group represented by the following general formula (3),

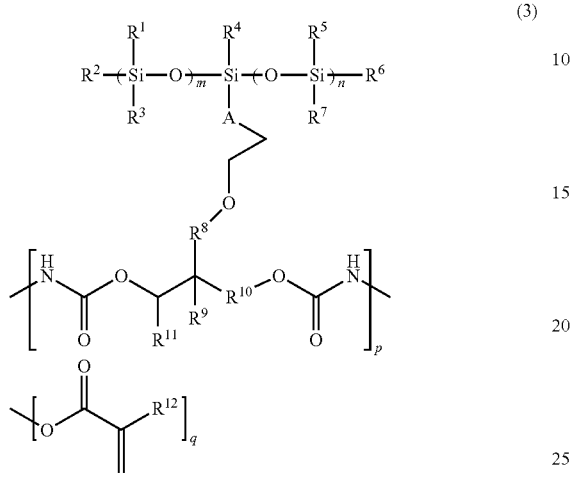
(3)

wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; A represents a linear or a branched alkylene group having 1 to 4 carbon atoms; each of "m" and "n" independently represents an integer of 1 to 5; $R^{12}$ represents a hydrogen atom or a methyl group; and each of "p" and "q" independently represents the number of unit in one molecule satisfying equations $1 \leq p \leq 100$ and $1 \leq q \leq 3$.

Illustrative example of the compound including an isocyanate group by reaction of the diol compound represented by the general formula (2) includes the following compounds.

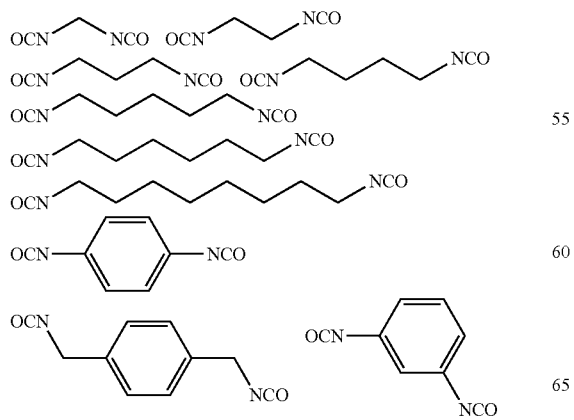

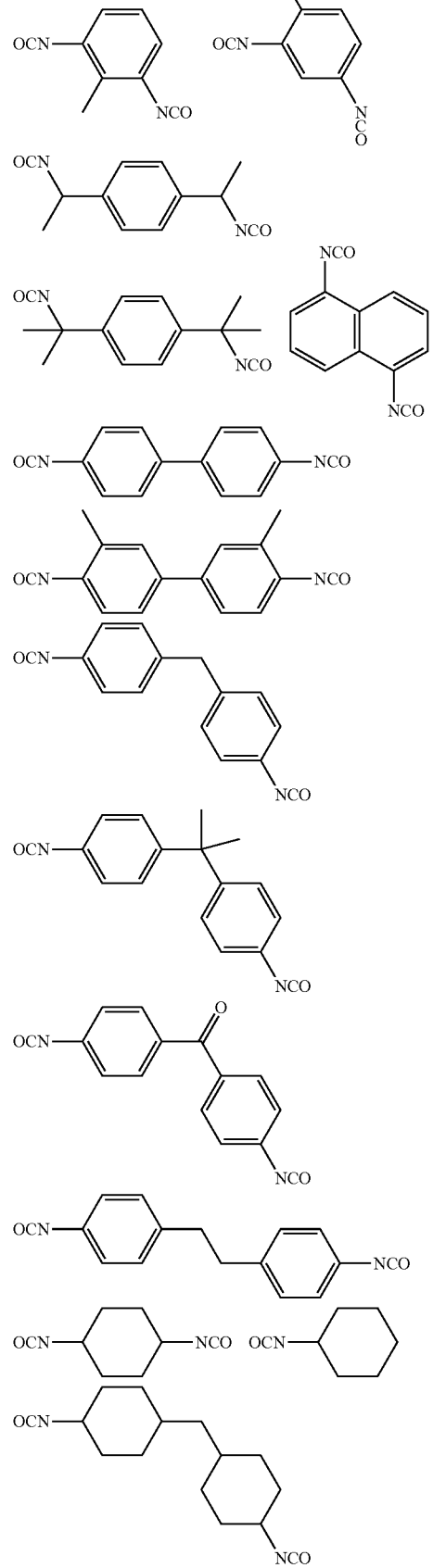

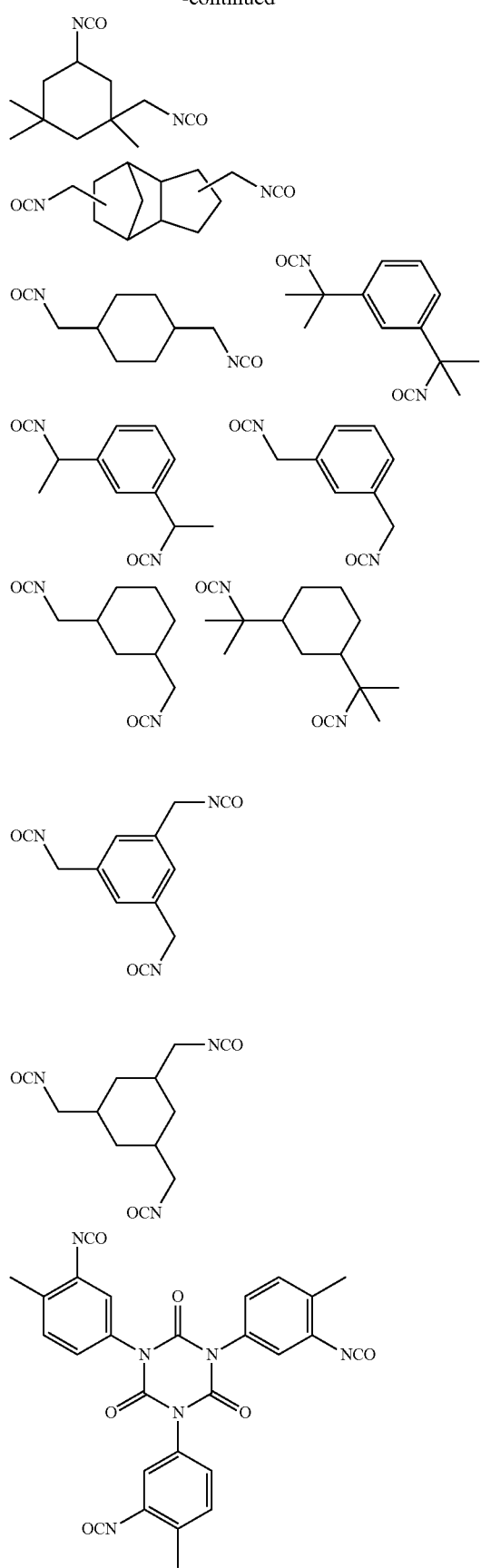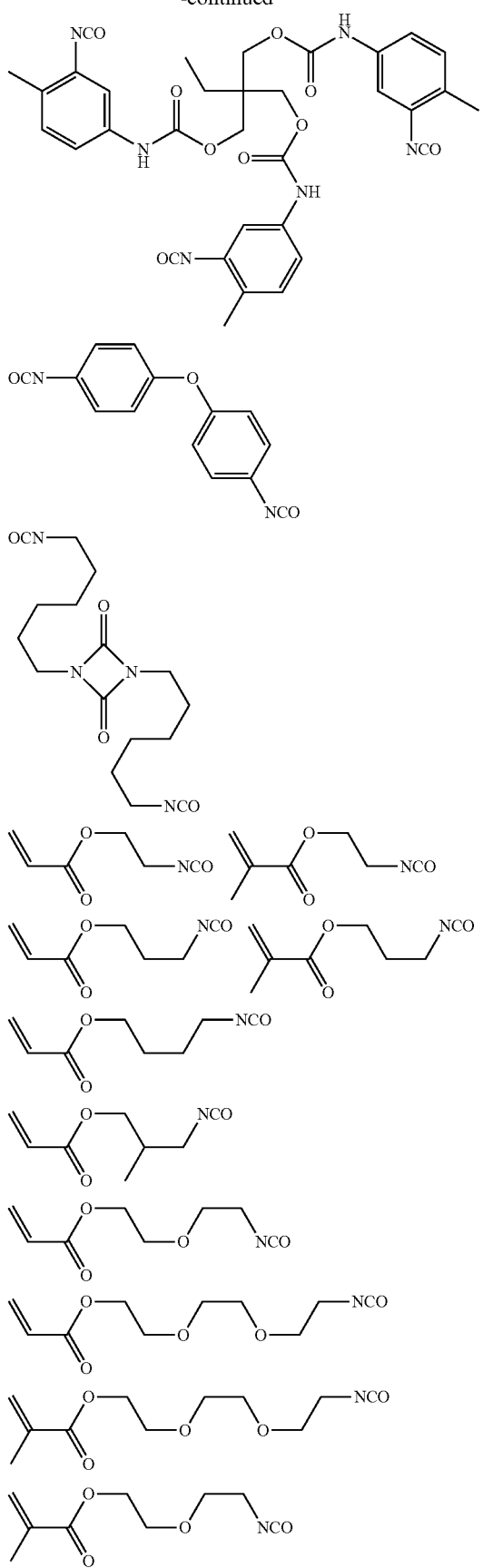

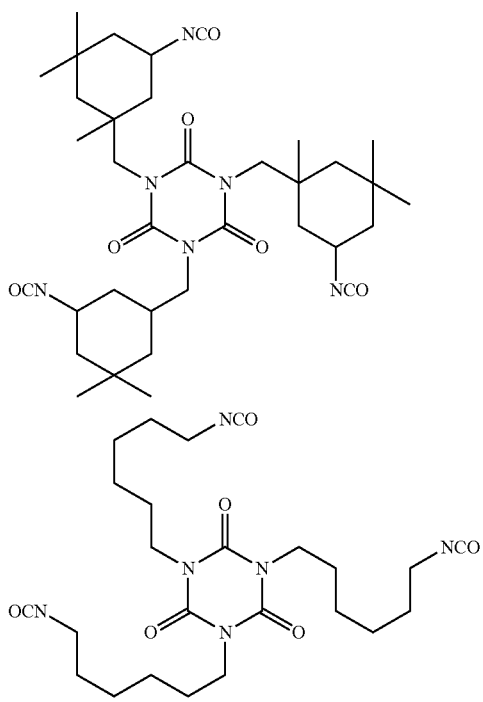
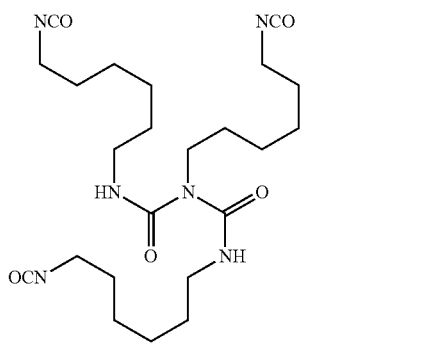
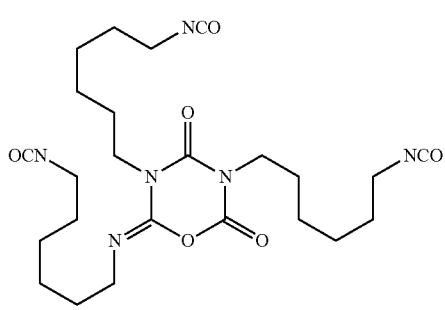
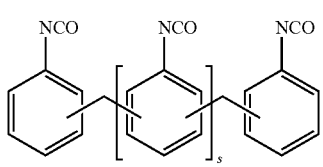

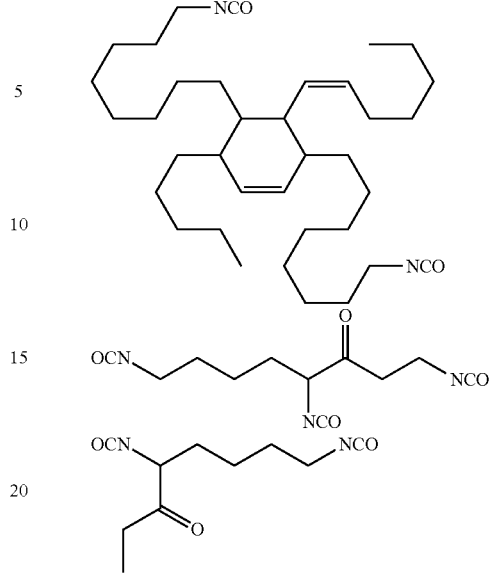

wherein, "s" represents an integer of 1 or more.

Each of the compounds having an isocyanate group which includes a (meth) acrylate group in particular is reacted with the diol compound represented by the general formula (2) to obtain a compound including a (meth) acrylate group as a terminal group represented by the general formula (3).

Each of the compounds including an isocyanate group can fail to properly control the diol compound represented by the general formula (2) (pendant silicone diol) due to its high reactivity. Also, the compounds including an isocyanate group may deactivate the isocyanate group by reaction with moisture in the air when kept in storage, which requires sufficient moisture control and other cautions. Accordingly, in order to prevent the problem, a compound including a blocked isocyanate group by protecting an isocyanate group with a substituent may be used.

A blocked isocyanate group is an isocyanate group obtained by deprotection of a blocking group by heating. Illustrative example thereof includes isocyanate groups substituted with alcohol, phenol, thioalcohol, imine, ketimine, amine, lactam, pyrazole, oxime, and β-diketone.

A catalyst may be added to lower the deprotection temperature of a blocked isocyanate group. Illustrative example of the catalyst includes organic tin such as dibutyltin dilaurate, bismuth salt, and zinc carboxylate such as zinc 2-ethylhexanoate and zinc acetate.

In particular, Patent Document of JP-A-2012-152725 describes a technique capable of colder deprotection reaction by including a α,β-unsaturated zinc carboxylate derived from carboxylic acid as a blocked isocyanate dissociation catalyst.

In addition to the diol compound represented by the general formula (2) and the compound including an isocyanate group, a compound including a plurality of hydroxyl groups may be added. The addition of such a compound including a plurality of hydroxyl groups carries out chain elongation and intermolecular crosslinking.

Illustrative example of the compound including a plurality of hydroxyl groups includes the following compounds.

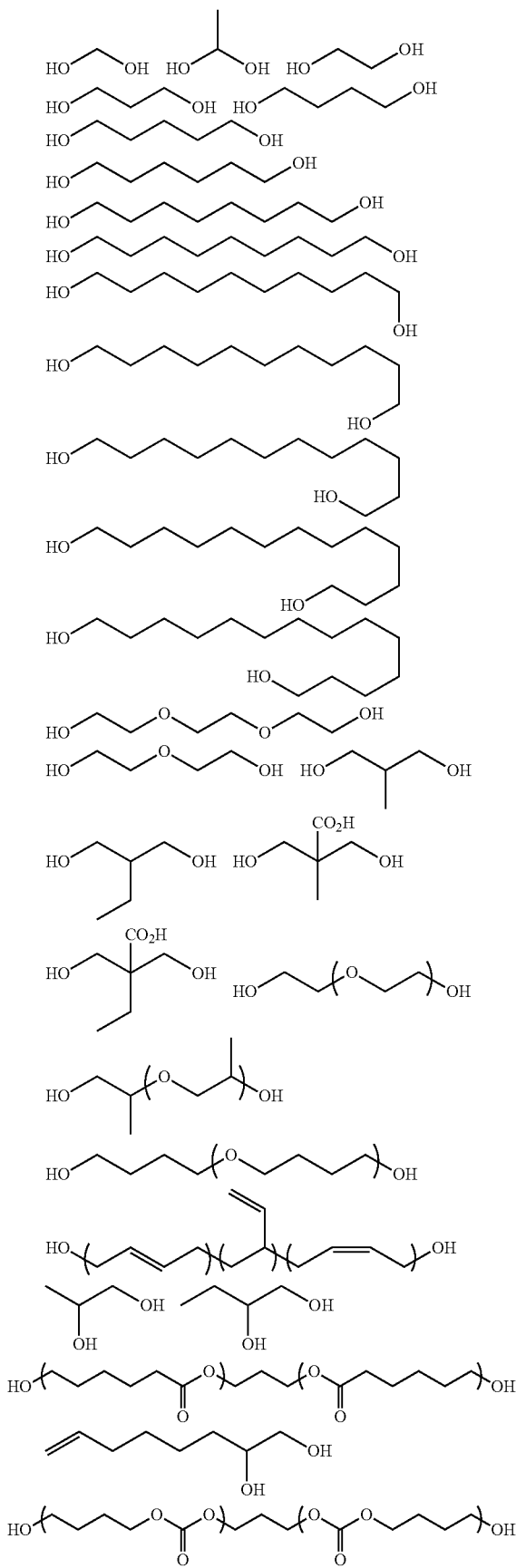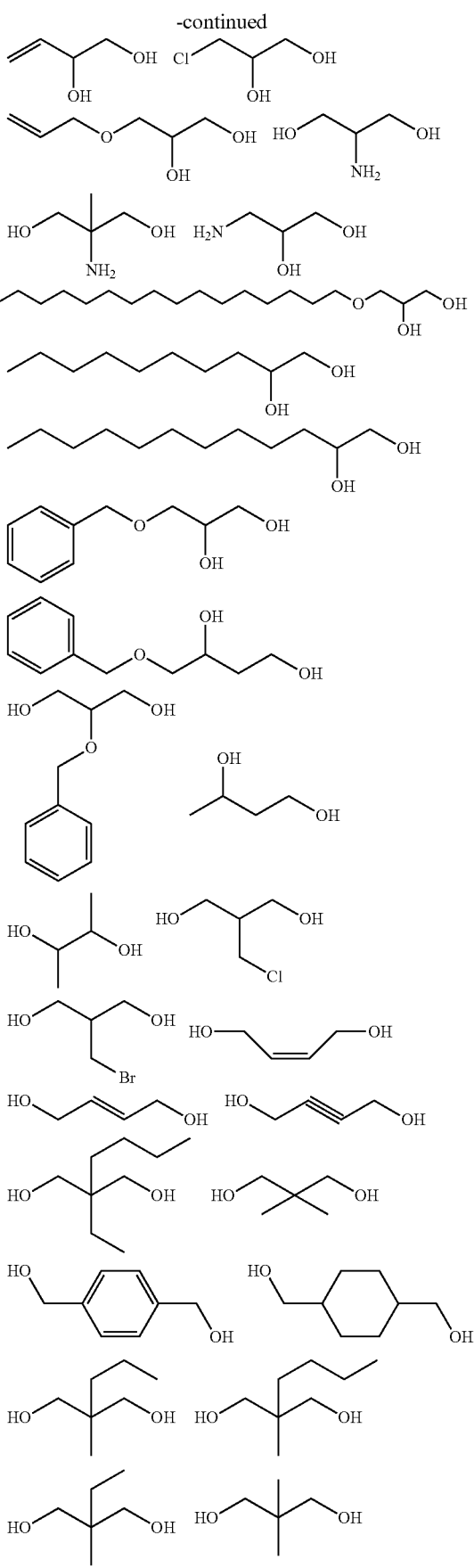

-continued
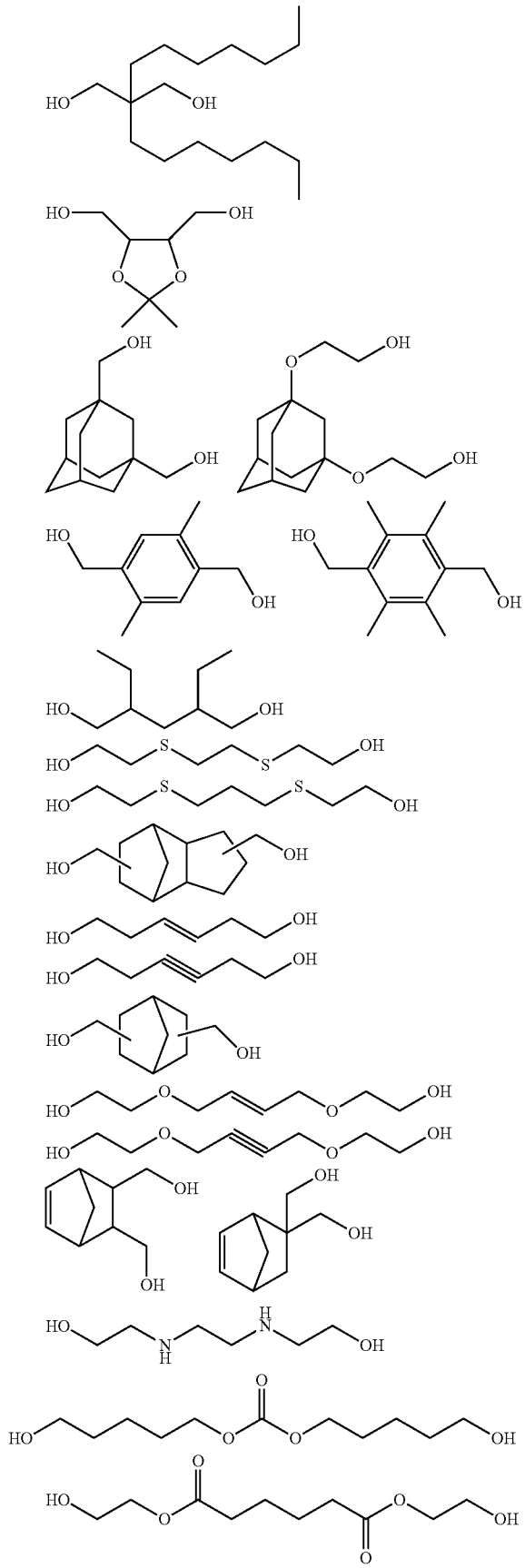
-continued
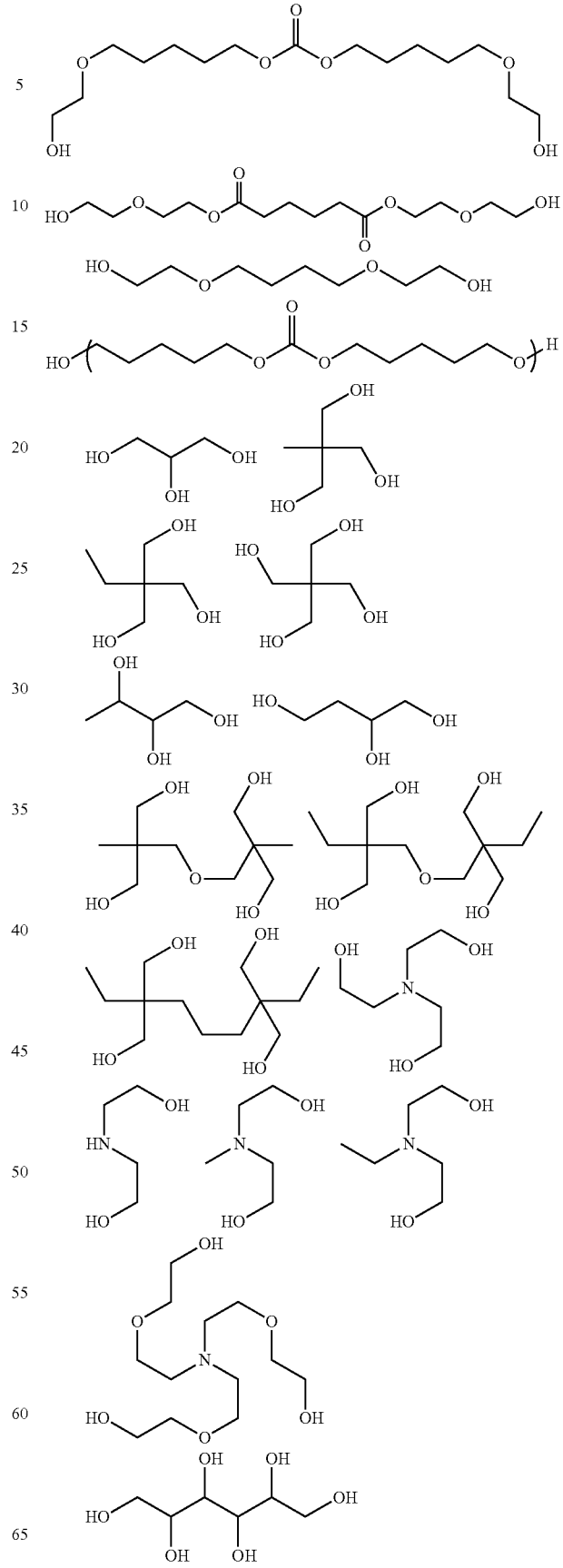

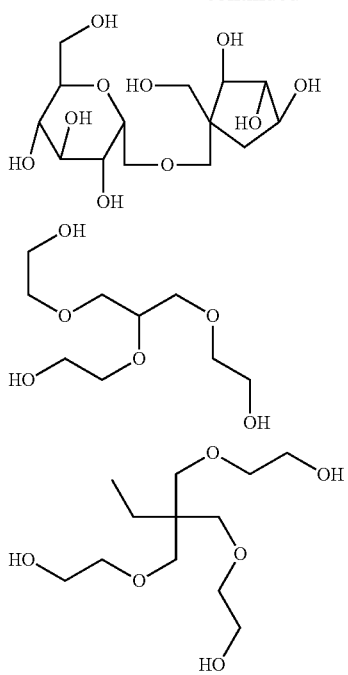

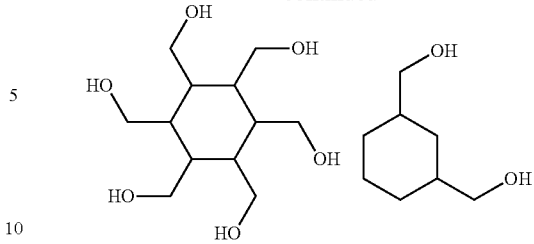

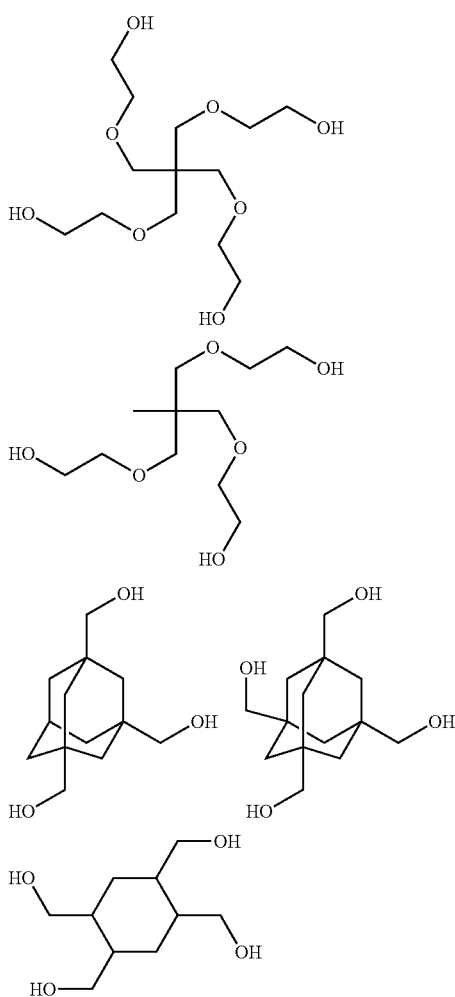

A compound including an amino group may be added. The reaction of an isocyanate group and an amino group forms a urea bond. The portion formed of a urethane bond and a urea bond is called as "hard segment," which improves the strength by the resulting hydrogen bond. Accordingly, the strength can be improved by addition of not only a urethane bond, but also a urea bond.

The resin preferably has a weight average molecular weight of 500 or more. The resin thus obtained can desirably be used in the stretchable film of the present invention. The upper limit of the weight average molecular weight of the resin is preferably 500,000 or fewer.

It is to be noted that the stretchable film of the present invention preferably has a stretching property (elongation break) of 40 to 500% in a tensile test stipulated according to JISK6251 standards. With the stretching property obtained, the stretchable film can particularly desirably be used as a film coated on a stretchable wire.

The stretchable film of the present invention is preferably used as a film in contact with a stretchable conductive wire. The stretchable film of the present invention can desirably be used particularly for these applications.

The stretchable film of the present invention described above can be a stretchable film excellent in stretch and strength that are equivalent to a single polyurethane component, and the film surface has excellent water repellency that is equivalent to a single silicone component.

A Method for Forming a Stretchable Film

The present invention provides a method for forming the afore-mentioned stretchable film, including: mixing a diol compound represented by the general formula (2) and a compound including an isocyanate group; shaping the mixture into a film; and curing the film by heating.

One example of the method for forming a stretchable film is that a protected or unprotected isocyanate compound, a compound including a plurality of hydroxyl groups for chain elongation or crosslinking, and in some cases, a compound including an amino group are mixed with the diol compound represented by the general formula (2), and the mixture is applied to a substrate for peeling to form a film to be cured by heating.

In the method, the reaction of isocyanate and alcohol forms a urethane bond with higher molecular weight to form a polymer network. The addition of a compound including 3 or more hydroxyl groups or isocyanate groups promotes crosslinking reaction to reduce the stretch, but to improve the film strength. Accordingly, the amount of a compound including two or 3 hydroxyl groups or isocyanate groups to be added is controlled to adjust the hardness, stretchable, and strength. Peeling of a film from the substrate after curing can obtain a single stretchable film.

One example of a method for forming a branched pendant silicone polyurethane-based stretchable film of the present invention is one-shot process by mixing a compound including a plurality of hydroxyl groups, a compound including an isocyanate group, and a diol compound represented by the general formula (2) and curing the mixture by heating. Advantageously, the one-shot process is highly productive, but a residual unreactive hydroxyl group or isocyanate group can reduce the strength or stretch.

Another example is prepolymer process. In this process, a compound including a plurality of hydroxyl groups and a compound including an isocyanate group are mixed beforehand, and a compound including a plurality of hydroxyl groups, a compound including an isocyanate group, and a compound represented by the general formula (2) are additionally mixed to be cured can be employed. The resulting sufficient reaction of a hydroxyl group and an isocyanate group can form a film having high strength and stretch and a residual isocyanate group in small quantities. Prepolymer preparation involves mixing not only a compound including a plurality of hydroxyl groups and a compound including an isocyanate group, but also a diol compound represented by the general formula (2). In this preparation process, an excess of isocyanate group is preferably mixed to include an isocyanate group as a terminal group of the prepolymer.

Also, a stretchable film can be formed by synthesizing the urethane (meth) acrylate polymer, adding a radical generator thereto, and crosslinking the product by free radical generated by light exposure or heating. A urethane polymer of ultra-high molecular weight can also be synthesized to mold the product into sheet by heating. In this method, such a thermoplastic urethane is called as thermoplastic polyurethane (TPU), which maintains the strength by a hydrogen bond between urethane polymers. Although TPU has no crosslinking structure, it has high strength due to strong hydrogen bond inherent in urethane. On the other hand, repeated film expansion unfortunately deforms a film, providing lower strength. This is because each time such expansion is repeated, the location of an intermolecular hydrogen bond changes like thermal deformation.

The urethane film crosslinked by (meth) acrylate polymerization has lower strength than the TPU film, but covalent bond by acrylic crosslinking, in addition to urethane's hydrogen bond, maintains the strength, thereby causing no thermal deformation and less strength reduction in a repeating expansion test.

The weight average molecular weight of a urethane (meth) acrylate resin and a urethane resin for TPU is preferably 500 or more. The resin thus obtained can desirably be used as the stretchable film of the present invention. The upper limit of the weight average molecular weight of the resin is preferably 500,000 or fewer.

Preferably, the rate of molar number of hydroxyl group is the same as or larger than the isocyanate group in the mixture, or the value by dividing the molar number of hydroxyl group by the molar number of isocyanate group is one or more. If the molar number of isocyanate group is smaller, reaction of an excess of isocyanate group and water generates no carbon dioxide, thereby no possibility of generating a hole in a film due to foam. Preferably, preparation of urethane foam involves an excess of isocyanate group. However, the stretchable film of the present invention requires high strength, preferably generating no hole of foam in a film.

When a resin included in the stretchable film of the present invention is formed with larger molar number of alcohol group than isocyanate group as described above, a urethane bond is formed only on either side of a diol compound represented by the general formula (2) at a terminal group of polymer. Consequently, a structure in which a urethane bond is formed on both sides like the structure represented by the general formula (1) and a portion generated otherwise can be found. In this case, the terminal group of polymer corresponds to a structure represented by the following general formula (1'),

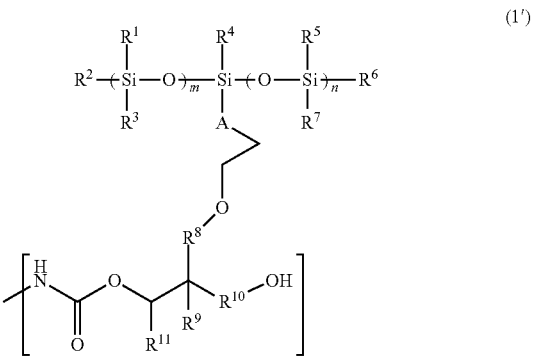

wherein, $R^1$ to $R^{11}$, A, "m" and "n" represent the same meanings as before.

The heating temperature is in the range of room temperature to 200° C., preferably in the range of 40 to 160° C. for 5 seconds to 60 minutes. In the heating curing process, either or both sides of a film may be covered with a peeled film. Preferably, either side is covered in roll winding curing process or both sides are covered in single wafer curing process, but curing is not restricted thereto.

A compound including a (meth) acrylate group as a terminal group represented by the general formula (3) is also shaped into a film and cured by heating and/or light exposure to form a stretchable film. Specifically, a protected or unprotected isocyanate compound and a compound including a plurality of hydroxyl groups for chain elongation or crosslinking are mixed with a diol compound represented by the general formula (2) for polymerization. Subsequently, a stretchable film can be formed, using a urethane polymer including a (meth) acrylate group as a terminal group of a polymer. In this film formation, (meth) acrylate is reacted with a free radical to be crosslinked. The method for radical crosslinking is preferably to add a radical generator. Illustrative example of the radical generator includes a heat radical generator for generating a free radical by thermal decomposition and a photo radical generator for generating a free radical by light exposure.

Illustrative example of the heat radical generator includes an azo radical generator and a peroxide radical generator. Illustrative example of the azo radical generator includes 2,2'-azobisisobutyronitrile (AIBN), 2,2'-azobis (2,4-dimethylvaleronitrile), 2,2'-azobis (2-methylpropionic acid)dimethyl, 2,2'-azobis (4-methoxy-2,4-dimethylvaleronitrile), 2,2'-azobis (cyclohexane-1-carbonitrile), and 4,4'-azobis (4-cyanovaleric acid). Illustrative example of the peroxide radical generator includes benzoyl peroxide, decanoyl peroxide, lauroyl peroxide, succinic acid peroxide, t-butylperoxy-2-ethylhexanoate, t-butylperoxypivaloate, and 1-1-3,3-tetramethylbutylperoxy-2-ethylhexanoate.

Illustrative example of the photo radical generator includes acetophenone, 4,4'-dimethoxybenzyl, benzyl, benzoin, benzophenone, 2-benzoylbenzoic acid, 4,4'-bis (dimethylamino)-benzophenone, 4,4'-bis (diethylamino)benzophenone, benzoinmethyl ether, benzoinethyl ether, benzoinisopropyl ether, benzoinbutyl ether, benzoinisobutyl ether, 4-benzoylbenzoic acid, 2,2'-bis (2-chlorophenyl)-4,4', 5,5'-tetraphenyl-1-2'-biimidazole, 2-benzoylbenzoic acid methyl, 2-(1,3-benzodioxole-5-yl)-4,6-bis(trichloromethyl)-1,3,5-triazine, 2-benzyl-2-(dimethylamino)-4'-morpholinobutyrophenone, 4,4'-dichlorobenzophenone, 2,2-diethoxyacetophenone, 2,2-dimethoxy-2-phenylacetophenone, 2,4-diethylthioxanthen-9-one, diphenyl (2,4,6-trimethylbenzoyl) phosphine oxide, 1,4-dibenzoylbenzene, 2-ethylanthraquinone, 1-hydroxycyclohexylphenyl ketone, 2-hydroxy-2-methylpropiophenone, 2-hydroxy-4'-(2-hydroxyethoxy)-2-methylpropiophenone, 2-isonitrosopropiophenone, 2-phenyl-2-(p-toluenesulfonyloxy) acetophenone (BAPO), and camphor quinone.

It is to be noted that the amount of the heat or photo radical generator to be added is preferably in the range of 0.1 to 50 parts by mass, relative to 100 parts by mass of resin.

In addition, a crosslinking agent including a plurality of (meth) acrylates or thiols may be added to improve the efficiency of radical crosslinking.

When a stretchable film is formed using a compound including a (meth) acrylate group as a terminal group, the film may be cured by combining thermal curing and light exposure curing processes. For example, a base stretchable film may be formed by thermal curing, and a stretchable film thereon may be formed by light exposure curing. Advantageously, the light exposure curing technique doesn't always require heating and allows for short-time curing. Unfortunately, the light exposure curing fails to cure portions that cannot receive light. A combination of thermal curing and light exposure curing can provide curing options, by taking advantage of each of the characteristics.

A typical method for forming a stretchable film is to apply a composition to a flat substrate or a roll. Illustrative example of the composition applying method includes spin coat, bar coat, roll coat, flow coat, dipping coat, spraying coat, and doctor coat. The thickness of a film to be applied is preferably 1 μm to 2 mm.

Preferable sealing of irregular parts involves such methods as roll coat and spray coating, and a method for application only to a required portion by screen printing and others. It is to be noted that the viscosity of a mixed solution needs adjusting to conduct various coating and printing. Low viscosity can be achieved by mixing an organic solvent, while high viscosity can be made by mixing a filler such as silica.

Preferably, the organic solvent has a boiling point at atmospheric pressure in the range of 115 to 200° C. Specifically, the organic solvent is preferably one or more types selected from 2-octanone, 2-nonanone, 2-heptanone, 3-heptanone, 4-heptanone, 2-hexanone, 3-hexanone, disobutyl ketone, methyl cyclohexanone, acetophenone, methylacetophenone, propyl acetate, butyl acetate, isobutyl acetate, amyl acetate, butenyl acetate, isoamyl acetate, phenyl acetate, propyl formate, butyl formate, isobutyl formate, amyl formate, isoamyl formate, methyl valerate, methyl pentenoate, methyl crotonate, ethyl crotonate, propylene glycol monomethyl ether, ethylene glycol monomethyl ether, propylene glycol monoethyl ether, ethylene glycol monoethyl ether, propylene glycol dimethyl ether, diethylene glycol dimethyl ether, propylene glycol monomethyl ether acetate, and propylene glycol monoethyl ether acetate.

When a compound including a (meth) acrylate group as a terminal group is cured by heating, thermal curing can be conducted e.g., on a hot plate or in an oven, or by far-infrared ray irradiation. Such a compound is preferably heated at 30 to 150° C. for 10 seconds to 60 minutes, and more preferably at 50 to 120° C. for 30 seconds to 20 minutes. Baking can be achieved in atmosphere, inert gas or vacuum.

When a compound including a (meth) acrylate group as a terminal group is cured by light exposure, the light exposure curing is preferably performed with a wavelength of 200 to 500 nm. A light source can be selected from a halogen lamp, a xenon lamp, an excimer laser, LED and others, and electron beam irradiation is also allowed. Preferably, the amount for irradiation is in the range of 1 mJ/cm$^2$ to 100 J/cm$^2$.

A resin including a structure represented by the general formula (1) is processed into fibers and then fabrics to provide a stretchable cloth or non-woven cloth, which can be formed as a stretchable film. The resin including a structure represented by the general formula (1) can be coated with polyester or cotton, thereby serving as a cloth or non-woven cloth to obtain a stretchable film.

Furthermore, a resin including a structure represented by the general formula (1) can also be employed as a urethane gel. Lower crosslinking density can form a gel having high water repellency, high stretch, and low hardness. Soft gels provide comfortable feeling, and sweat or water repellency.

As described above, the method for forming a stretchable film of the present invention provides stretch and strength that are equivalent to or more desirable than a single polyurethane component. In addition, a stretchable film having high water repellency on the film surface can readily be formed.

Figure 2:
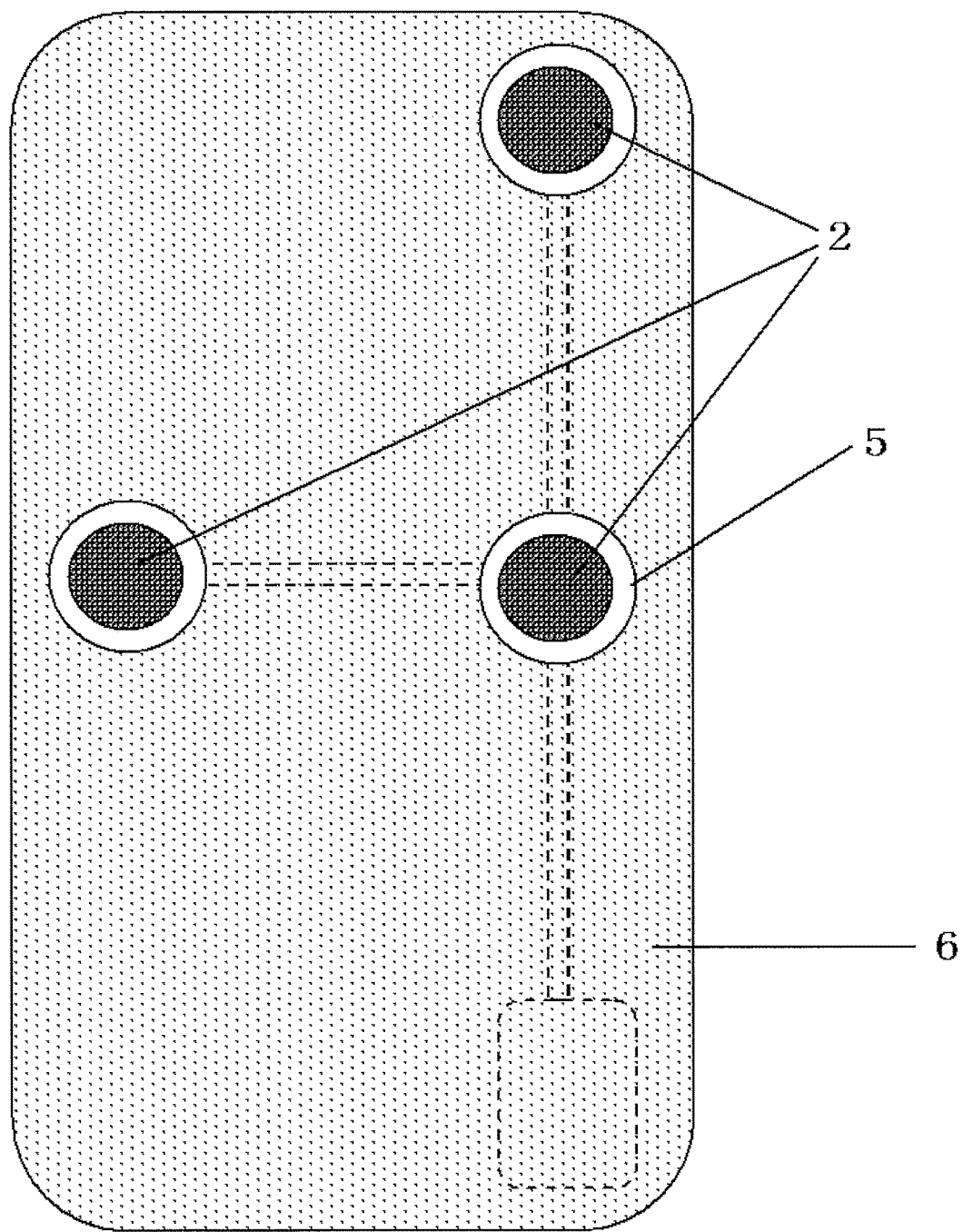
FIG. 2 is a schematic illustration showing the electrocardiograph shown in FIG. 1 viewed from a bio-electrode.
Figure 3:
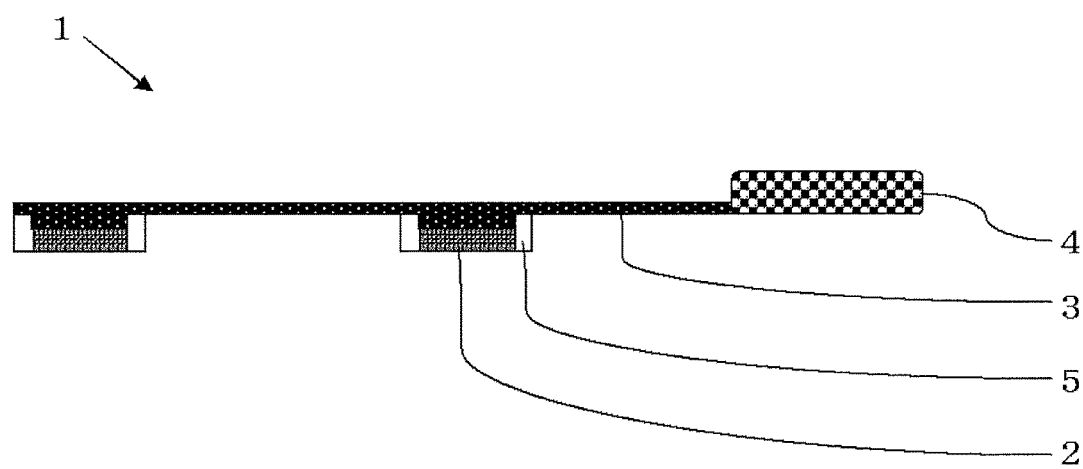
FIG. 3 is a cross-sectional view showing an electrocardiograph that is not covered with the stretchable film of the present invention.
Figure 4:
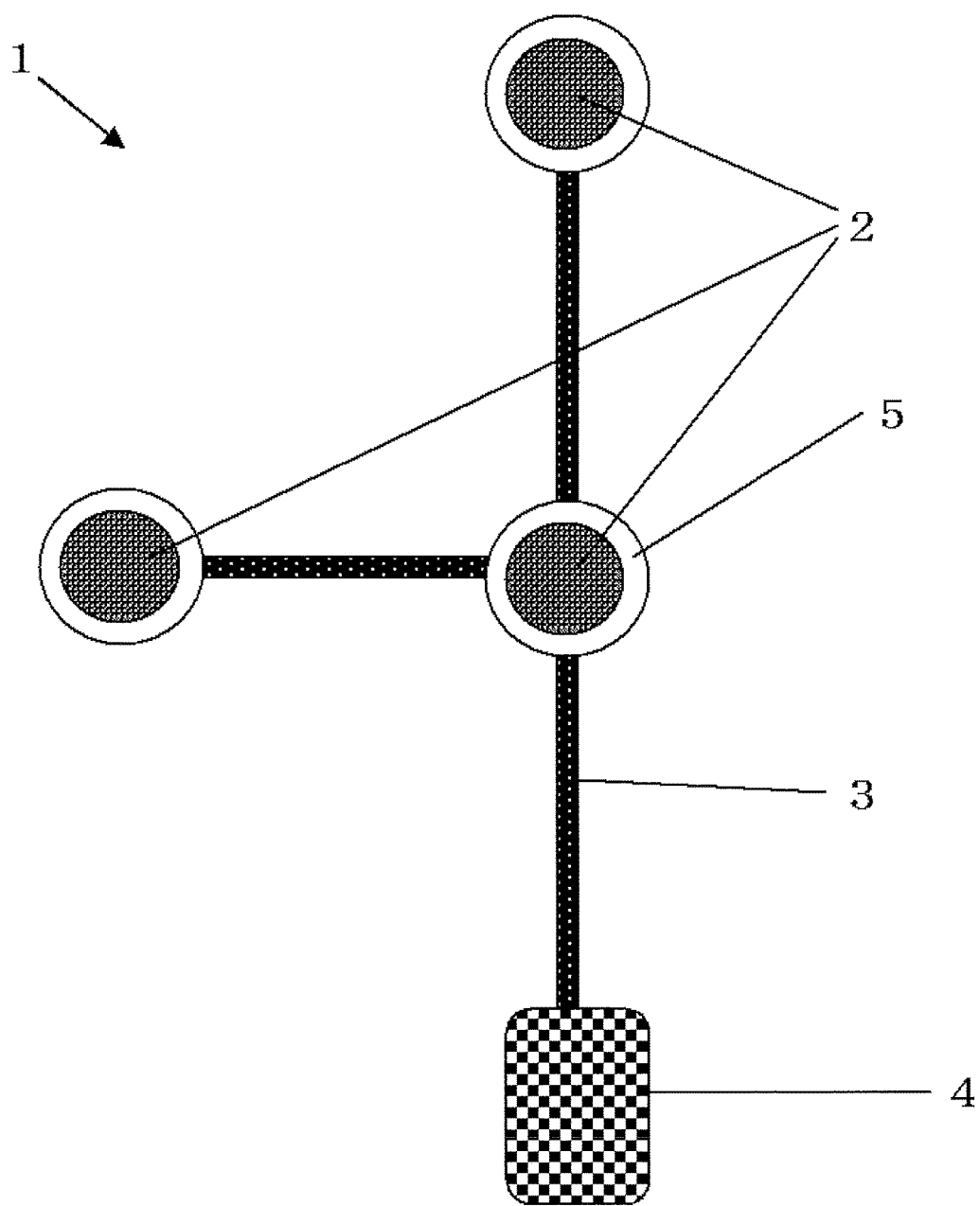
FIG. 4 is a schematic illustration showing the electrocardiograph shown in FIG. 3 viewed from a bio-electrode.

Herein, FIGS. 1 to 9 show the applications of a stretchable film of the present invention. FIG. 1 is a cross-sectional view of an electrocardiograph that is covered with a stretchable film of the present invention, and FIG. 2 is a schematic illustration of the electrocardiograph shown in FIG. 1 viewed from the bio-electrode side. FIG. 3 is a cross-sectional view showing an electrocardiograph that is not covered with the stretchable film of the present invention. FIG. 4 is a schematic illustration of the electrocardiograph shown in FIG. 3 viewed from the bio-electrode side. The electrocardiographs shown in FIGS. 3 and 4 are described in Patent Document 1. As shown in FIGS. 3 and 4, an electrocardiograph 1 includes three bio-electrodes 2, a wire 3 for transmitting an electric signal connected to each of the electrodes, and a center device 4 connected to the wire.

The wire 3 may be formed of a metal such as gold, silver, platinum, titanium, and stainless, and a conductive material such as carbon. It is to be noted that, in order to provide sufficient stretch, the wire may be meandering-shaped as shown in Patent Document 1. Also, the wire may be formed by applying a powder of the conductive material or wire-shaped conductive material to a stretchable film, printing a conductive ink including the conductive material, or using a conductive cloth composed of a conductive material and fibers combined.

Since the electrocardiograph 1 must be applied to the user's skin, as shown in FIGS. 3 and 4, an adhesive portion 5 is disposed around each of the bio-electrodes 2 to prevent each bio-electrodes 2 from coming off the skin. It is to be noted that the use of an adhesive bio-electrode 2 doesn't necessarily require an adhesive portion 5.

The electrocardiograph 1, as shown in FIG. 1, is covered with a stretchable film 6 as the stretchable film of the present invention. However, as shown in FIG. 2, since the bio-electrode 2 and the adhesive portion 5 must be applied to the skin, these are not covered with the stretchable film 6.

Figure 5:
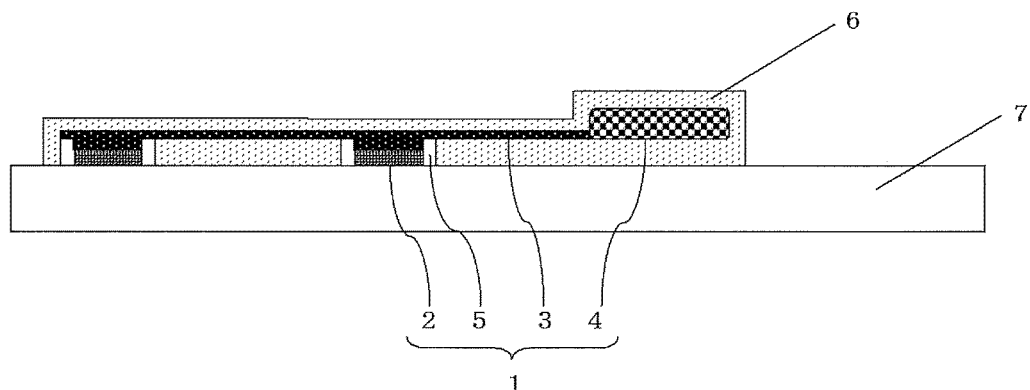
FIG. 5 is a cross-sectional view showing that the electrocardiograph is contacted on a substrate and covered with the stretchable film of the present invention.

When the electrocardiograph 1 is covered with the stretchable film 6, both or either of front and back surfaces of the electrocardiograph 1 may be covered. It is to be noted that, since the bio-electrode 2 and the adhesive portion 5 in contact with the skin must not be covered, e.g., as shown in FIG. 5, the electrocardiograph 1 is placed on a peeling substrate 7 so as to bring the adhesive portion 5 into contact therewith to be covered with a stretchable film material, and cured by light or heating to form a stretchable film 6. Thereafter, the product can be peeled from the substrate 7 to obtain an electrocardiograph 1 that is covered with the stretchable film 6 shown in FIG. 1.

Figure 6:
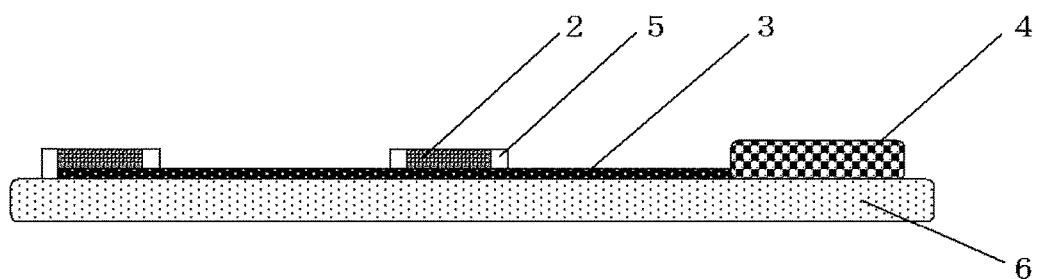
FIG. 6 is a cross-sectional view showing that a bio-electrode, an adhesive portion, and a wire are formed on the stretchable film of the present invention, to which the center device is further connected.
Figure 7:
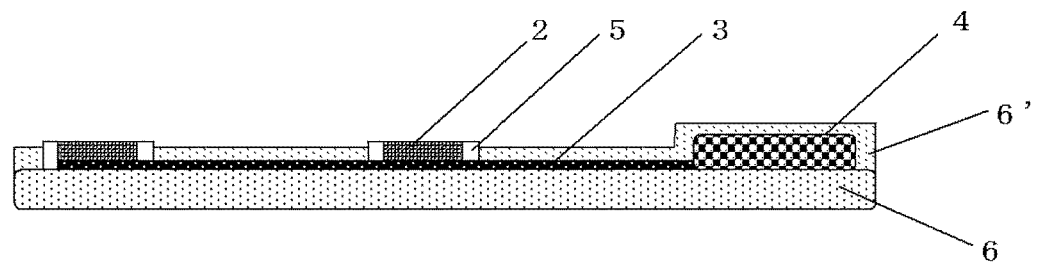
FIG. 7 is a cross-sectional view showing that the wire and the center device of FIG. 6 are covered with the stretchable film of the present invention.

As shown in FIG. 6, a bio-electrode 2, an adhesive portion 5, and a wire 3 may be formed on a stretchable film 6 to be connected to a center device 4, and as shown in FIG. 7, the stretchable film material may be applied thereon and cured to form a stretchable film 6'. In this method, the bio-electrode 2, the adhesive portion 5, and the wire 3 may be formed on the stretchable film 6 formed on a peeling substrate 7.

Figure 8:
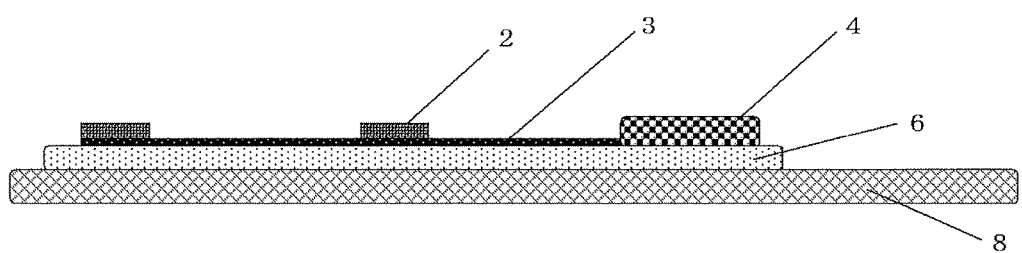
FIG. 8 is a cross-sectional view showing that the stretchable film of the present invention is formed on a cloth, on which the wire and the electrode are formed, to which the center device is further connected.
Figure 9:
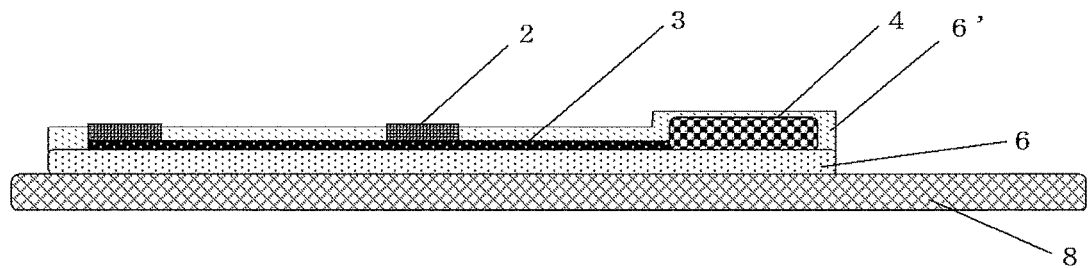
FIG. 9 is a cross-sectional view showing that the wire and the center device of FIG. 8 are covered with the stretchable film of the present invention.

Furthermore, as shown in FIG. 8, a stretchable film 6 is formed on a cloth 8, on which a bio-electrode 2 and a wire 3 may be formed to be connected to a center device 4, on which a stretchable film 6' may be formed, as shown in FIG. 9, to cover a wire 3 and a center device 4.

It is to be noted that, as shown in FIGS. 5, 7, and 9, when a stretchable film is formed on an irregular part, as described above, such methods as roll coat and spray coating, and a method for application only to a required portion by screen printing and others are preferable.

As shown in FIGS. 6 to 9, a stretchable film 6' is formed on a stretchable film 6, use of a compound represented by the general formula (3) can form the stretchable film 6 by thermal curing, and form the stretchable film 6' thereon by light exposure curing.

EXAMPLE

The present invention will be described with reference to the Examples and Comparative Examples, but the present invention is not restricted thereto. It is to be noted that the weight average molecular weight (Mw) refers to that in terms of polystyrene according to GPC.

Pendant silicone diol compounds 1 to 8 blended into a composition for forming a stretchable film, a comparative pendant silicone diol compound 1, isocyanate compounds 1 to 4, and hydroxy compounds 1 to 7 are shown as follows.

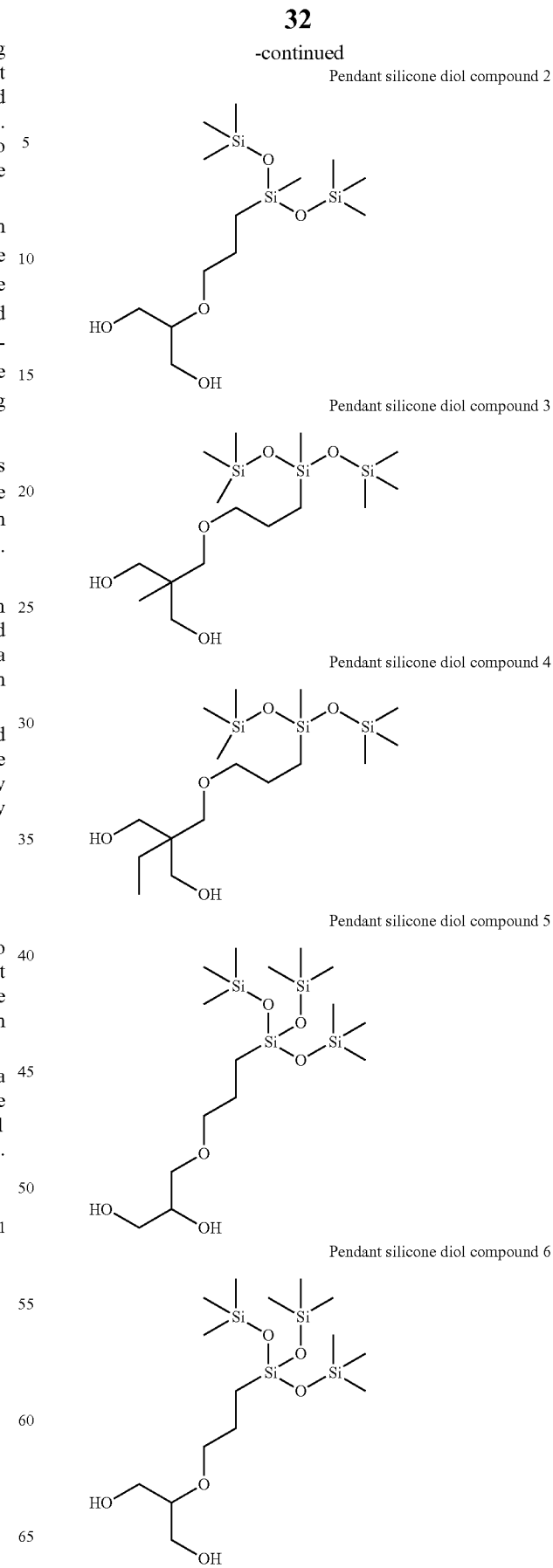

Comparative pendant silicone diol compound 1

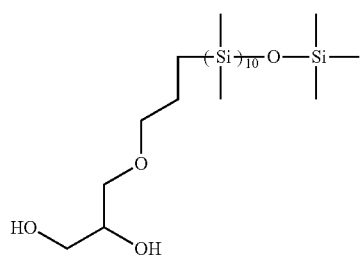

Pendant silicone diol compound 7

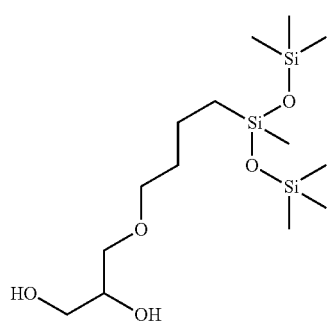

Pendant silicone diol compound 8

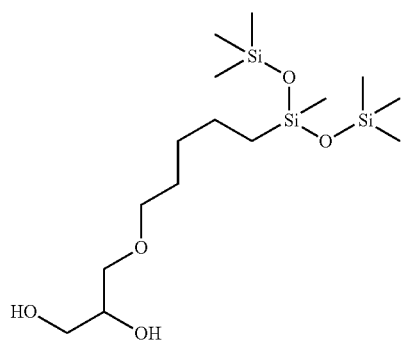

wherein, the repeating unit represents the average.

Isocyanate compound 1

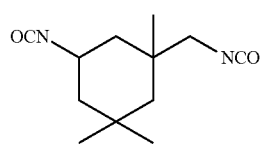

Isocyanate compound 2

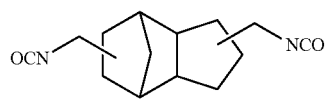

Isocyanate compound 3

Isocyanate compound 4

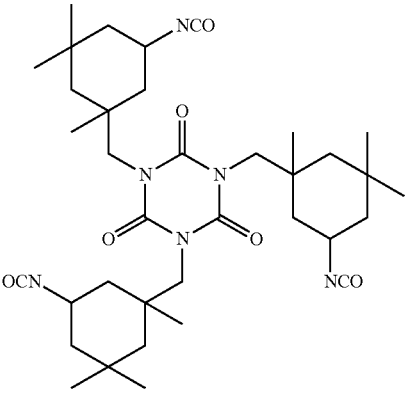

Hydroxy compound 1

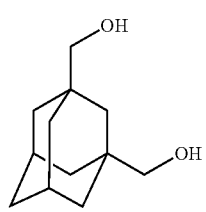

Hydroxy compound 2

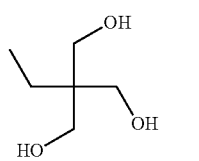

Hydroxy compound 3

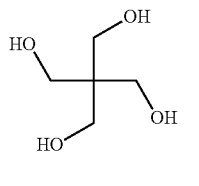

Hydroxy compound 4

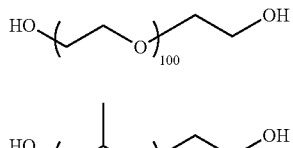

Hydroxy compound 5

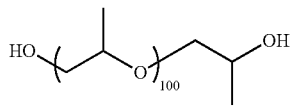

Hydroxy compound 6

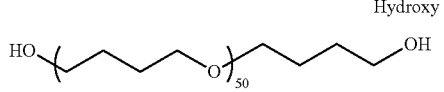

Hydroxy compound 7

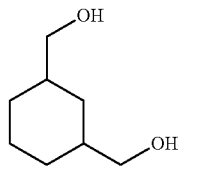

wherein, the repeating unit represents the average.

Pendant silicone urethane (meth) acrylates 1 to 8 blended into a composition for forming a stretchable film as a compound including a (meth) acrylate group as a terminal group, a pendant silicone methacrylate 1, and a comparative urethane (meth) acrylate 1 are shown as follows.

Pendant silicone urethane (meth) acrylate 1
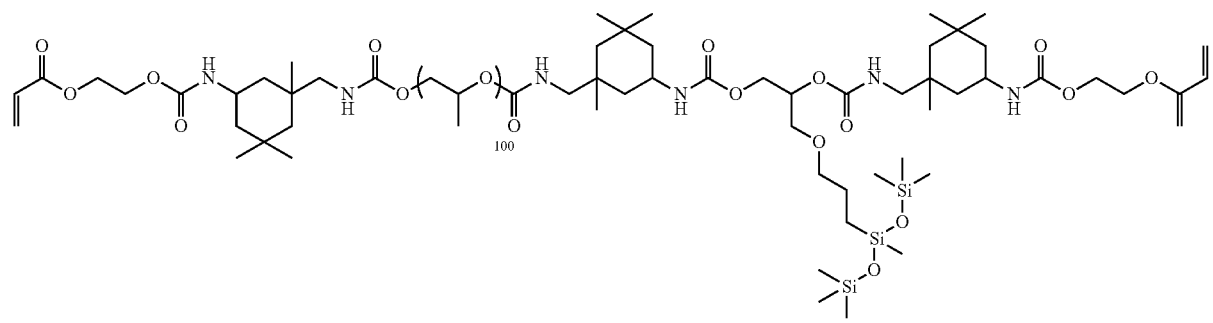
Pendant silicone urethane (meth) acrylate 2
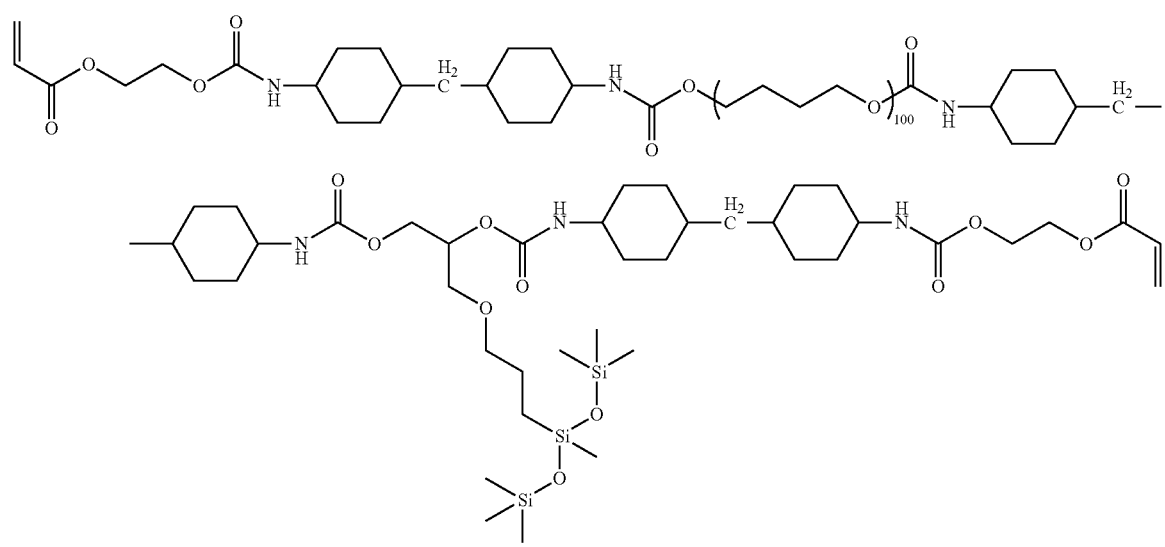
Pendant silicone urethane (meth) acrylate 3
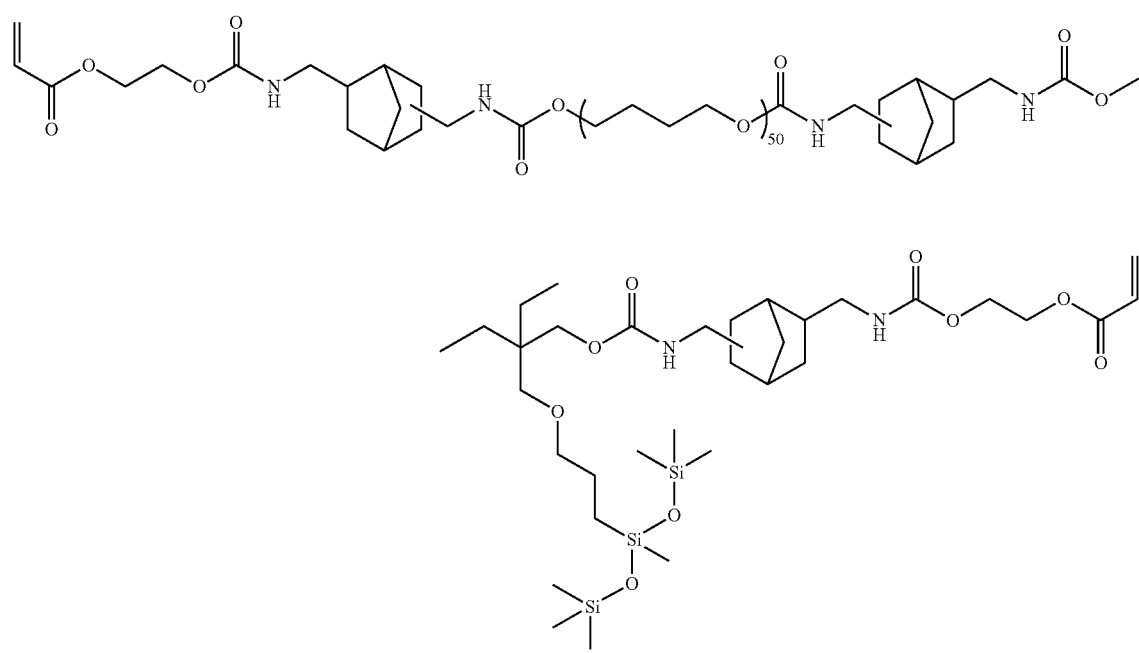

Pendant silicone urethane (meth) acrylate 4
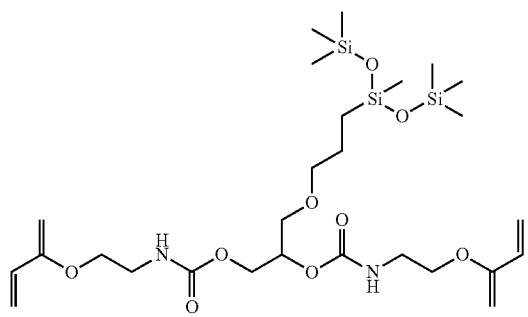
Pendant silicone urethane (meth) acrylate 5
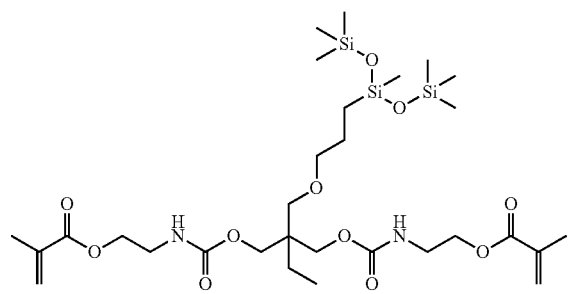
Pendant silicone urethane (meth) acrylate 6
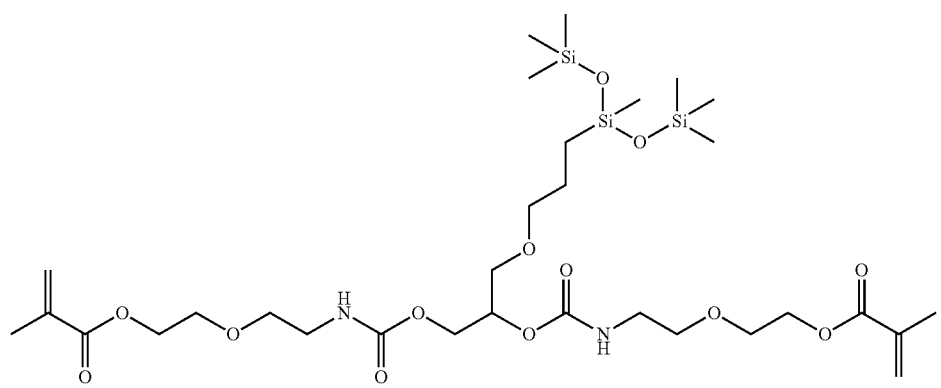
Pendant silicone urethane (meth) acrylate 7
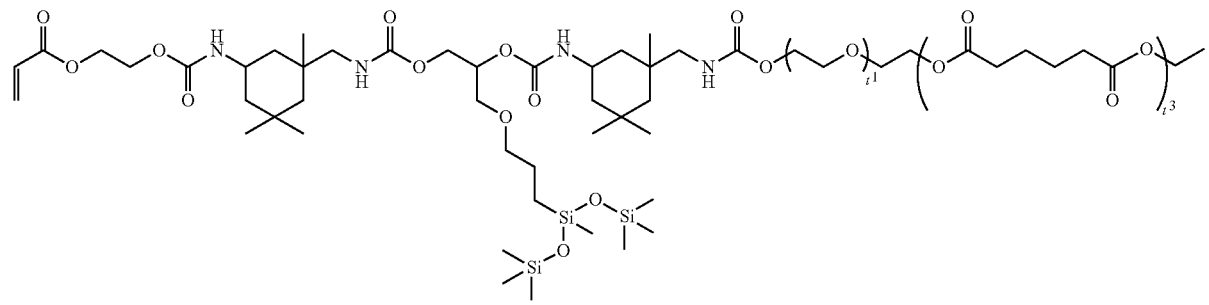
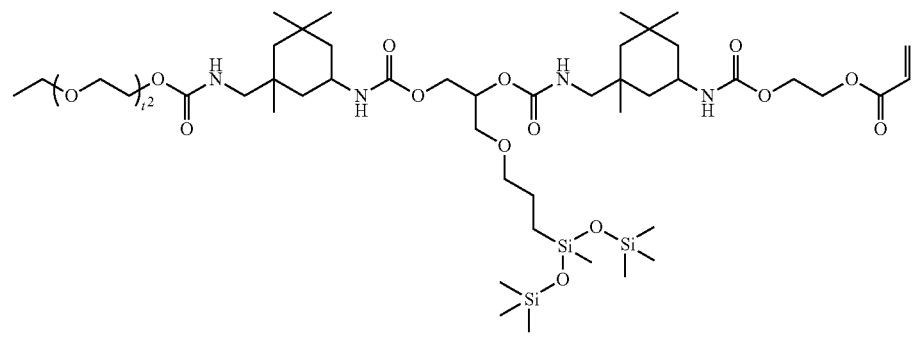

-continued

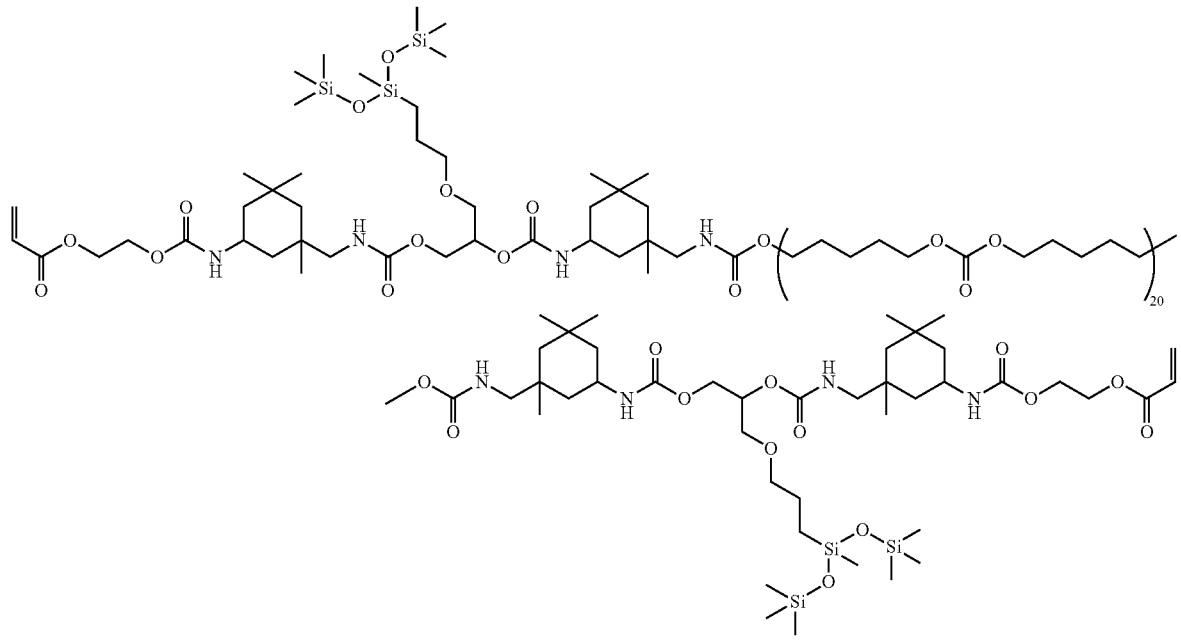

Pendant silicone urethane (meth) acrylate 8

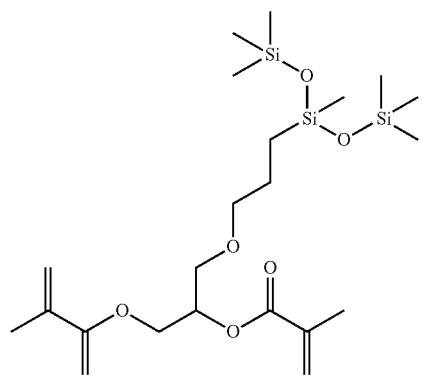

Pendant silicone methacrylate 1

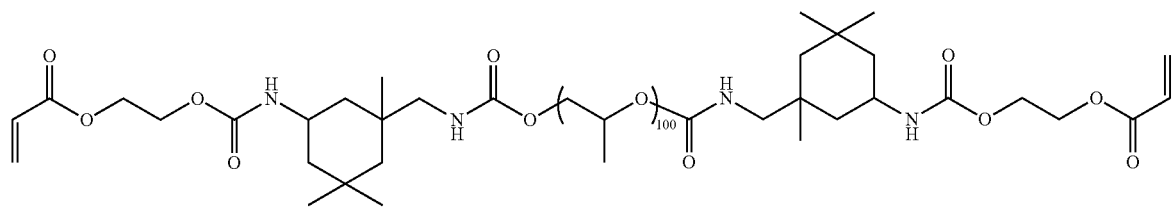

Comparative urethane (meth) acrylate 1 wherein, the repeating unit represents the average, $t^1+t^2$ averages 20, and $t^3$ averages 10.

Photo radical generators 1 to 3 blended into a composition for forming a stretchable film as an additive, and heat radical generator 1 and 2 are shown as follows.
Photo radical generator 1: 4,4'-dimethoxybenzyl
Photo radical generator 2: 2,2-dimethoxy-2-phenylacetophenone
Photo radical generator 3: (±)-camphor quinone
Heat radical generator 1: 2,2'-azobis (2-methylpropionic acid)-dimethyl
Heat radical generator 2: azobisisobutyronitrile (AIBN)

The organic solvent blended into a composition for forming a stretchable film is shown as follows.
Organic solvent: propylene glycol monomethyl ether acetate (PGMEA)

Example, Comparative Example

With compositions described in Table 1, a pendant silicone diol compound, an isocyanate compound, a hydroxy compound, and an additive were mixed to prepare compositions for forming a stretchable film (stretchable film materials 1-1 to 1-9 and a comparative stretchable film material 1-1). After deaeration, the stretchable film materials 1-1 to 1-9 and the comparative stretchable film material 1-1 were applied to a polyethylene substrate by bar coat method and baked at 130° C. for 20 minutes to prepare stretchable films (Films 1-1 to 1-9, a comparative Film 1-1) on the substrate.
The molar numbers of hydroxyl group and isocyanate group in the compositions for forming a stretchable film are also shown in Table 1.

TABLE 1

| composition for forming stretchable film | Pendant silicone diol compound (parts by mass) | Isocyanate compound (parts by mass) | Hydroxy compound (parts by mass) | Additive (parts by mass) | Hydroxy group/isocyanate group (molar ratio) |
|---|---|---|---|---|---|
| Stretchable film material 1-1 | Pendant silicone diol compound 1 (3) | Isocyanate compound 1 (16) | Hydroxy compound 1 (10), Hydroxy compound 2 (2), Hydroxy compound 4 (5) | — | 1.15 |
| Stretchable film material 1-2 | Pendant silicone diol compound 2 (3) | Isocyanate compound 2 (14) | Hydroxy compound 5 (10), Hydroxy compound 3 (3) | — | 1.11 |
| Stretchable film material 1-3 | Pendant silicone diol compound 3 (5) | Isocyanate compound 3 (9) | Hydroxy compound 6 (10), Hydroxy compound 3 (3) | — | 1.12 |
| Stretchable film material 1-4 | Pendant silicone diol compound 4 (5) | Isocyanate compound 3 (9) | Hydroxy compound 3 (3), Hydroxy compound 7 (5), Hydroxy compound 6 (10) | — | 1.26 |
| Stretchable film material 1-5 | Pendant silicone diol compound 5 (5) | Isocyanate compound 1 (8) Isocyanate compound 4 (3) | Hydroxy compound 7 (5), Hydroxy compound 6 (10) | — | 1.15 |
| Stretchable film material 1-6 | Pendant silicone diol compound 5 (5) | Isocyanate compound 1 (8) Isocyanate compound 4 (3) | Hydroxy compound 7 (5), Hydroxy compound 6 (10) | Hexa methylene diamine (2) | 1.15 |
| Stretchable film material 1-7 | Pendant silicone diol compound 6 (5) | Isocyanate compound 1 (8) Isocyanate compound 4 (3) | Hydroxy compound 7 (5), Hydroxy compound 6 (10) | — | 1.16 |
| Stretchable film material 1-8 | Pendant silicone diol compound 7 (5) | Isocyanate compound 1 (8) Isocyanate compound 4 (3) | Hydroxy compound 7 (5), Hydroxy compound 6 (10) | — | 1.14 |
| Stretchable film material 1-9 | Pendant silicone diol compound 8 (5) | Isocyanate compound 1 (8) Isocyanate compound 4 (3) | Hydroxy compound 7 (5), Hydroxy compound 6 (10) | — | 1.13 |
| Comparative Stretchable film material 1-1 | Comparative Pendant silicone diol compound 1 (5) | Isocyanate compound 1 (6) Isocyanate compound 4 (3) | Hydroxy compound 7 (5), Hydroxy compound 6 (10) | — | 1.20 |

With compositions described in Table 2, a compound including a (meth) acrylate group as a terminal group, photo radical generators 1 to 3, heat radical generators 1 and 2, and an organic solvent were mixed to prepare compositions for forming a stretchable film (stretchable film materials 2-1 to 2-7, a comparative stretchable film material 2-1). The compositions for forming a stretchable film prepared on the polyethylene substrate was applied by bar coat method, and the stretchable film materials 2-1 to 2-5 and the comparative stretchable film material 2-1 were irradiated with a 1,000 W xenon lamp (500 mJ/cm$^2$) in nitrogen atmosphere to cure the composition applied films to prepare stretchable films (Films 2-1 to 2-5 and a comparative Film 2-1). As for the stretchable film materials 2-6 and 2-7, compositions for forming a stretchable film prepared on the polyethylene substrate were applied by bar coat method and baked in nitrogen atmosphere at 120° C. for 20 minutes to prepare stretchable films (Films 2-6 and 2-7).

TABLE 2

| composition for forming stretchable film | Compound including (meth) acrylate group at terminal group (parts by mass) | Additive (parts by mass) | Organic solvent (parts by mass) |
|---|---|---|---|
| Stretchable film material 2-1 | Pendant silicone urethane (meth) acrylate 1 (100) | Photo radical generator 1 (3) | — |
| Stretchable film material 2-2 | Pendant silicone urethane (meth) acrylate 2 (85) Pendant silicone urethane (meth) acrylate 4 (15) | Photo radical generator 2 (3) | — |
| Stretchable film material 2-3 | Pendant silicone urethane (meth) acrylate 3 (75) Pendant silicone urethane (meth) acrylate 5 (25) | Photo radical generator 3 (3) | — |
| Stretchable film material 2-4 | Pendant silicone urethane (meth) acrylate 1 (80) Pendant silicone urethane (meth) acrylate 6 (20) | Photo radical generator 3 (3) | — |

TABLE 2-continued

| composition for forming stretchable film | Compound including (meth) acrylate group at terminal group (parts by mass) | Additive (parts by mass) | Organic solvent (parts by mass) |
|---|---|---|---|
| Stretchable film material 2-5 | Pendant silicone urethane (meth) acrylate 1 (95) Pendant silicone (meth) acrylate 1 (5) | Photo radical generator 3 (3) | — |
| Stretchable film material 2-6 | Pendant silicone urethane (meth) acrylate 7 (100) | Heat radical generator 1 (3) | PGMEA (100) |
| Stretchable film material 2-7 | Pendant silicone urethane (meth) acrylate 8 (100) | Heat radical generator 2 (3) | PGMEA (100) |
| Comparative stretchable film material 2-1 | Comparative urethane (meth) acrylate 1 (100) | Photo radical generator 1 (3) | — |

Measurement of Film Thickness, Contact Angle, Stretching Property, and Strength

The film thickness and the contact angle of water of the surface in each of the cured stretchable films were measured. After the contact angle measurement, the stretchable films were peeled from the substrate, and the stretching property and strength were measured according to a JISK6251 method. Table 3 shows the results.

TABLE 3

| | Stretchable film | Stretchable film material | Film thickness (μm) | Contact angle (degrees) | Stretching property (%) | Strength (MPa) |
|---|---|---|---|---|---|---|
| Example 1-1 | Film 1-1 | Stretchable film material 1-1 | 350 | 88 | 270 | 4.7 |
| Example 1-2 | Film 1-2 | Stretchable film material 1-2 | 340 | 91 | 160 | 3.9 |
| Example 1-3 | Film 1-3 | Stretchable film material 1-3 | 330 | 88 | 160 | 4.2 |
| Example 1-4 | Film 1-4 | Stretchable film material 1-4 | 366 | 89 | 130 | 5.7 |
| Example 1-5 | Film 1-5 | Stretchable film material 1-5 | 360 | 87 | 90 | 6.4 |
| Example 1-6 | Film 1-6 | Stretchable film material 1-6 | 340 | 88 | 122 | 2.9 |
| Example 1-7 | Film 1-7 | Stretchable film material 1-7 | 390 | 92 | 132 | 2.5 |
| Example 1-8 | Film 1-8 | Stretchable film material 1-8 | 360 | 93 | 320 | 13.2 |
| Example 1-9 | Film 1-9 | Stretchable film material 1-9 | 390 | 94 | 330 | 13.9 |
| Example 2-1 | Film 2-1 | Stretchable film material 2-1 | 290 | 89 | 180 | 3.7 |
| Example 2-2 | Film 2-2 | Stretchable film material 2-2 | 280 | 88 | 150 | 4.2 |
| Example 2-3 | Film 2-3 | Stretchable film material 2-3 | 410 | 89 | 130 | 4.6 |
| Example 2-4 | Film 2-4 | Stretchable film material 2-4 | 360 | 91 | 150 | 4.8 |
| Example 2-5 | Film 2-5 | Stretchable film material 2-5 | 360 | 91 | 135 | 4.4 |
| Example 2-6 | Film 2-6 | Stretchable film material 2-6 | 210 | 86 | 150 | 7.1 |
| Example 2-7 | Film 2-7 | Stretchable film material 2-7 | 220 | 88 | 80 | 10.9 |
| Comparative Example 1-1 | Comparative Film 1-1 | Comparative Stretchable film material 1-1 | 310 | 93 | 120 | 2.1 |
| Comparative Example 2-1 | Comparative Film 2-1 | Comparative Stretchable film material 2-1 | 280 | 81 | 180 | 1.1 |

As shown in Table 3, stretchable films, in Examples 1-1 to 1-9 where diol compounds pendant with a short chain branched silicone are reacted with an isocyanate compound, and Examples 2-1 to 2-7 where compounds including a (meth) acrylate group as a terminal group pendant with a short chain branched silicone are used, show high water contact angle, or high water repellency, and excellent stretch and strength.

On the other hand, a stretchable film in Comparative Example 2-1 where a compound including a (meth) acrylate group as a terminal group, having no siloxane bond, is used shows lower water contact angle than in Examples 1-1 to 1-9 and 2-1 to 2-7, or lower water repellency and less excellent strength. A stretchable film in Comparative Example 1-1 where a diol compound pendant with linear silicone is reacted with an isocyanate compound shows higher water contact angle, but less excellent strength.

As described above, the stretchable film of the present invention has excellent stretch and strength, and excellent water repellency on the film surface, showing excellent properties as a film for covering a stretchable wire used in wearable devices.

While this invention has been described with an emphasis upon preferred embodiments, it will be obvious to those of ordinary skill in the art that variations of the preferred embodiments may be used and that it is intended that the invention may be practiced otherwise than as specifically described herein.

Accordingly, this invention includes all modifications encompassed within the spirit and scope of the invention as defined by the following claims.

EXPLANATIONS OF LETTERS OR NUMERALS

1 . . . Electrocardiograph, 2 . . . Bio-electrode, 3 . . . Wire, 4 . . . Center device, 5 . . . Adhesive portion, 6,6' . . . Stretchable film, 7 . . . Substrate, 8 . . . Cloth.

What is claimed is:

1. A stretchable film comprising a resin, wherein the resin includes a structure represented by the following general formula (1),

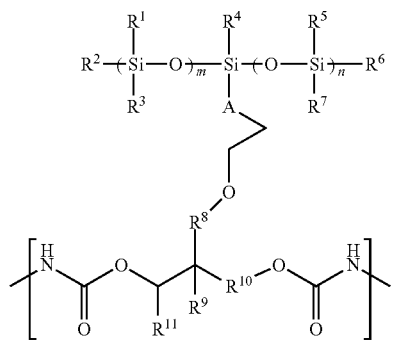

wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; A represents a linear or a branched alkylene group having 1 to 4 carbon atoms; and each of "m" and "n" independently represents an integer of 1 to 5.

2. The stretchable film according to claim 1, wherein the resin is a reactant of a diol compound represented by the following general formula (2) and a compound including an isocyanate group,

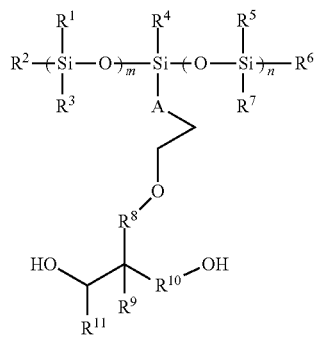

wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; A represents a linear or a branched alkylene group having 1 to 4 carbon atoms; and each of "m" and "n" independently represents an integer of 1 to 5.

3. The stretchable film according to claim 1, wherein the resin is a cured product of a compound including a (meth)acrylate group as a terminal group represented by the following general formula (3),

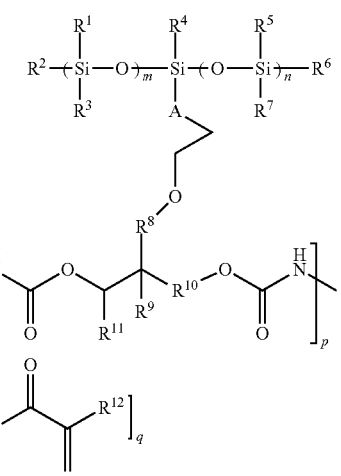

wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; A represents a linear or a branched alkylene group having 1 to 4 carbon atoms; each of "m" and "n" independently represents an integer of 1 to 5; $R^{12}$ represents a hydrogen atom or a methyl group; and each of "p" and "q" independently represents the number of unit in one molecule satisfying equations $1 \leq p \leq 100$ and $1 \leq q \leq 3$.

4. The stretchable film according to claim 2, wherein the resin is a cured product of a compound including a (meth)acrylate group as a terminal group represented by the following general formula (3),

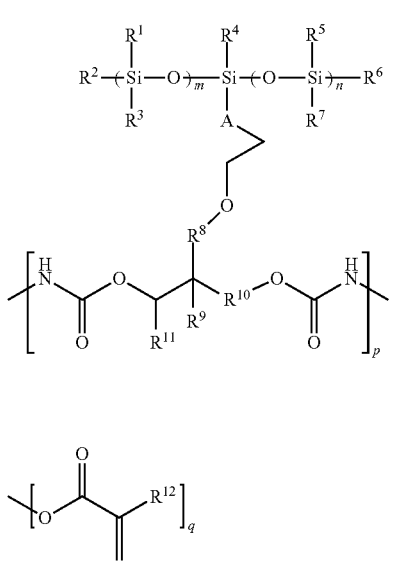

(3)

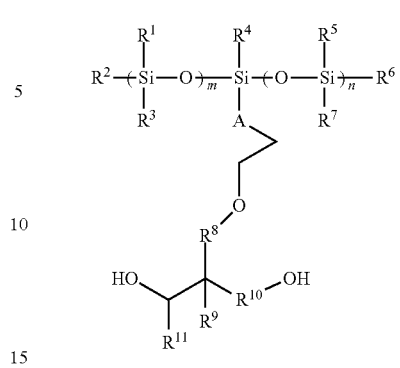

(2)

wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; A represents a linear or a branched alkylene group having 1 to 4 carbon atoms; $R^{12}$ represents a hydrogen atom or a methyl group; and each of "p" and "q" independently represents the number of unit in one molecule satisfying equations $1 \leq p \leq 100$ and $1 \leq q \leq 3$.

5. The stretchable film according to claim 1, wherein the resin has a weight average molecular weight of 500 or more.

6. The stretchable film according to claim 2, wherein the resin has a weight average molecular weight of 500 or more.

7. The stretchable film according to claim 1, wherein the stretchable film has a stretching property of 40 to 500% in a tensile test stipulated according to JISK6251 standards.

8. The stretchable film according to claim 2, wherein the stretchable film has a stretching property of 40 to 500% in a tensile test stipulated according to JISK6251 standards.

9. The stretchable film according to claim 1, wherein the stretchable film is used as a film in contact with a stretchable conductive wire.

10. The stretchable film according to claim 2, wherein the stretchable film is used as a film in contact with a stretchable conductive wire.

11. A method for forming a stretchable film, comprising:
mixing a diol compound represented by the following general formula (2) and a compound including an isocyanate group; shaping the resulting mixture into a film; and curing the film by heating, wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; A represents a linear or a branched alkylene group having 1 to 4 carbon atoms; and each of "m" and "n" independently represents an integer of 1 to 5.

12. A method for forming a stretchable film, comprising:
shaping a compound including a (meth) acrylate group as a terminal group represented by the following general formula (3) into a film; and curing the film by heating and/or light exposure,

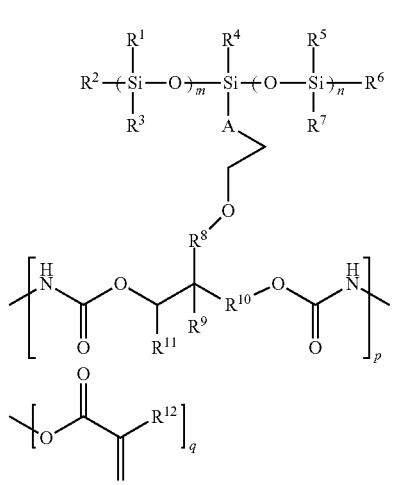

(3)

wherein, each of $R^1$, $R^2$, $R^3$, $R^5$, $R^6$, and $R^7$ independently represents any of a linear or a branched alkyl group, a phenyl group, or a 3,3,3-trifluoropropyl group having 1 to 4 carbon atoms; $R^4$ represents any of a linear or a branched alkyl group, a phenyl group, a 3,3,3-trifluoropropyl group, or a trialkylsiloxy group having 1 to 4 carbon atoms; each of $R^8$ and $R^{10}$ independently represents any of a single bond, a methylene group, or an ethylene group, and the total number of carbon atoms of $R^8$ and $R^{10}$ is 1 or 2; $R^9$ represents a hydrogen atom or a linear alkyl group having 1 to 4 carbon atoms; $R^{11}$ represents a hydrogen atom or a methyl group; each of "m" and "n" independently represents an integer of 1 to 5; $R^{12}$ represents a hydrogen atom or a methyl group; A represents a linear or a branched alkylene group having 1 to 4 carbon atoms; and each of "p" and "q" independently represents the number of unit in one molecule satisfying equations $1 \leq p \leq 100$ and $1 \leq q \leq 3$.

* * * * *